(12) United States Patent
Yamamoto et al.

(10) Patent No.: US 10,512,907 B2
(45) Date of Patent: *Dec. 24, 2019

(54) RESIN HAVING ANION-EXCHANGE GROUP, AND RESIN-CONTAINING LIQUID, MULTILAYER BODY, MEMBER, ELECTROCHEMICAL ELEMENT, AND ELECTROCHEMICAL DEVICE THAT INCLUDE THE SAME

(71) Applicant: NITTO DENKO CORPORATION, Ibaraki-shi, Osaka (JP)

(72) Inventors: Mizuki Yamamoto, Osaka (JP); Takeshi Nakano, Osaka (JP); Koso Matsuda, Osaka (JP); Hiroyuki Nishii, Osaka (JP); Takashi Suzuki, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 54 days.

This patent is subject to a terminal disclaimer.

(21) Appl. No.: 15/557,316

(22) PCT Filed: Mar. 11, 2016

(86) PCT No.: PCT/JP2016/001407
§ 371 (c)(1),
(2) Date: Sep. 11, 2017

(87) PCT Pub. No.: WO2016/147640
PCT Pub. Date: Sep. 22, 2016

(65) Prior Publication Data
US 2018/0050335 A1 Feb. 22, 2018

(30) Foreign Application Priority Data

Mar. 13, 2015 (JP) .................................. 2015-051417
Mar. 13, 2015 (JP) .................................. 2015-051419
(Continued)

(51) Int. Cl.
*H01M 8/00* (2016.01)
*B01J 41/14* (2006.01)
(Continued)

(52) U.S. Cl.
CPC ............... *B01J 41/14* (2013.01); *B01J 41/05* (2017.01); *B32B 27/08* (2013.01); *B32B 27/306* (2013.01);
(Continued)

(58) Field of Classification Search
CPC .. B01J 41/14; B01J 41/05; H01M 2300/0094; H01M 2300/0082; H01M 2008/1095;
(Continued)

(56) References Cited

U.S. PATENT DOCUMENTS 5,128,041 A 7/1992 Degen et al.
9,692,072 B2 * 6/2017 Suzuki ........................ C08J 5/22
(Continued)

FOREIGN PATENT DOCUMENTS

EP 3157085 A1 4/2017
JP 2009140783 A 6/2009
(Continued)

OTHER PUBLICATIONS

Extended European Search Report issued for European Patent Application No. 16764471.5, dated Jul. 5, 2018, 7 pages.
(Continued)

*Primary Examiner* — Nicholas P D'Aniello
(74) *Attorney, Agent, or Firm* — Hamre, Schumann, Mueller & Larson, P.C.

(57) ABSTRACT

Provided is a resin including a copolymer having a first structural unit and/or second structural unit and a structural unit having a polar group.
(Continued)

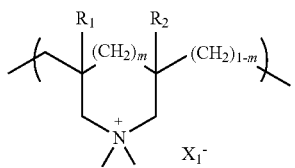

First structural unit

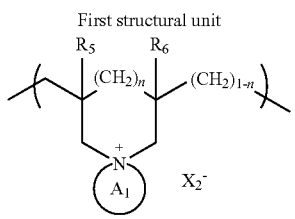

Second structural unit $R_1$, $R_2$, $R_5$, and $R_6$ are each independently a hydrogen atom or an alkyl group having 1 to 8 carbon atoms, $R_3$ and $R_4$ are each independently a hydrogen atom or an alkyl group having 1 to 18 carbon atoms, $A_1$ is a saturated carbon chain having 3 to 7 carbon atoms or a structure resulting from substitution of a heteroatom for a part of the carbon atoms of the saturated carbon chain, m and n are each independently 0 or 1, and $X_1$ and $X_2$ are each independently a halide ion, a hydroxide ion, or an anion of an organic or inorganic acid.

23 Claims, 3 Drawing Sheets

(30) Foreign Application Priority Data

Mar. 13, 2015 (JP) .................. 2015-051421
Dec. 28, 2015 (JP) .................. 2015-256117

(51) Int. Cl.
| | | |
|---|---|---|
| C08F 261/04 | (2006.01) | |
| H01M 4/86 | (2006.01) | |
| B01J 41/05 | (2017.01) | |
| B32B 27/08 | (2006.01) | |
| B32B 27/30 | (2006.01) | |
| H01B 1/12 | (2006.01) | |
| H01M 8/1018 | (2016.01) | |

(52) U.S. Cl.
CPC .......... *C08F 261/04* (2013.01); *H01B 1/121* (2013.01); *H01M 4/86* (2013.01); *H01M 8/1018* (2013.01); *B32B 2457/18* (2013.01); *H01M 2008/1095* (2013.01)

(58) Field of Classification Search
CPC .. H01M 8/1018; H01M 8/106; H01M 8/1053; H01M 8/103; H01M 4/86; H01B 1/121; H01B 1/12; H01B 1/06; C08F 261/04; C08F 226/06; C08F 226/04; C08F 210/02; B32B 2457/18; B32B 27/08; B32B 27/306; B32B 27/00
See application file for complete search history.

(56) References Cited

U.S. PATENT DOCUMENTS

| | | |
|---|---|---|
| 2005/0034829 A1 | 2/2005 | Sugiyama et al. |
| 2011/0014550 A1 | 1/2011 | Jiang et al. |
| 2011/0281197 A1* | 11/2011 | Daikoku ............... C08F 226/04 429/480 |
| 2015/0010848 A1 | 1/2015 | Suzuki et al. |

FOREIGN PATENT DOCUMENTS

| | | | |
|---|---|---|---|
| JP | 2010236129 A | 10/2010 | |
| JP | 2014180643 A | 9/2014 | |
| WO | 9913159 A1 | 3/1999 | |
| WO | WO-2013136762 A1 * | 9/2013 | .......... H01M 8/1023 |

OTHER PUBLICATIONS

International Search Report for PCT/JP2016/001407, dated May 17, 2016, 5 pages including English translation.

* cited by examiner

RESIN HAVING ANION-EXCHANGE GROUP, AND RESIN-CONTAINING LIQUID, MULTILAYER BODY, MEMBER, ELECTROCHEMICAL ELEMENT, AND ELECTROCHEMICAL DEVICE THAT INCLUDE THE SAME

TECHNICAL FIELD

The present invention relates to: a resin having an anion-exchange group and suitable for use in an electrochemical device; a material including the resin and used for forming an electrochemical device; and an electrochemical device.

BACKGROUND ART

Known examples of electrochemical devices, which provide electrical energy through a chemical reaction or which cause a chemical reaction upon input of electrical energy, include various batteries and hydrogen production devices. Polymer electrolyte fuel cells (PEFCs), which are a type of electrochemical device, employ a polymer electrolyte membrane as an ion exchange part and have the advantages of being operable at lower temperatures than other types of fuel cells and having high output density. PEFCs are therefore highly expected to become widely used in the future. Conventional PEFCs are typically of the cation-exchange type employing a cation-exchange membrane that conducts hydrogen ions. However, in recent years, there have been an increasing number of reports of anion-exchange PEFCs employing an anion-exchange membrane, partly because anion-exchange PEFCs are capable of generating electricity without using a catalyst containing platinum which is expensive and the resources of which are scarce. Anion-exchange PEFCs use a liquid fuel (alkaline liquid fuel) such as hydrazine. The use of hydrazine as a fuel has a great advantage in that the fuel does not produce carbon dioxide ($CO_2$), according to the electricity generation principle.

An anion-exchange polymer electrolyte fuel cell includes an anion-exchange membrane which is a polymer electrolyte membrane, a cathode catalyst layer, and an anode catalyst layer. Such a catalyst layer contains a resin having anionic conductivity and a catalyst. The resin contained in the catalyst layer serves to impart anionic conductivity to the catalyst layer and enhance the bond strength between the anion-exchange membrane and the catalyst layer. To allow a resin having an anion-exchange group to be uniformly distributed in a catalyst layer, a resin-containing liquid which is a solution or suspension of the resin in an organic solvent is used for formation of the catalyst layer. Thus, the resin having an anion-exchange group is required to be successfully dissolved or suspended in the solvent used in the resin-containing liquid and is particularly required to have high solubility in the solvent. For example, Patent Literature 1 discloses a resin having an anion-exchange group and having high solubility in organic solvents such as chloroform, THF (tetrahydrofuran), and 1-propanol.

CITATION LIST

Patent Literature

Patent Literature 1: JP 2009-140783 A

SUMMARY OF INVENTION

Technical Problem

Organic solvents traditionally used as solvents for dissolving resins having anion-exchange groups have caused great concern in terms of environmental impact and, in addition, they need to be carefully handled due to their high flammability.

Water does not raise the above concern and is easy to handle. However, if the water solubility of a resin having an anion-exchange group is excessively high, the resin may be dissolved out of a catalyst layer formed from a solution of the resin during electricity generation in a fuel cell including the catalyst layer. Such dissolution can occur because a catalyst layer of an anion-exchange polymer electrolyte fuel cell is exposed to a water-rich environment due to the production of water at the anode of the fuel cell and in some cases due to supply of a liquid fuel including water, such as hydrazine hydrate. Thus, a resin having an anion-exchange group and intended for use in an anion-exchange polymer electrolyte fuel cell is desired to be highly soluble in a solvent that has less environmental impact and is easier to handle than organic solvents and that is not water itself. An example of such a solvent is a mixed solvent of an organic solvent and water, and a specific example is a mixed solvent of water and a water-soluble organic solvent such as methanol or ethanol. Electrochemical devices other than PEFCs can suffer the same problems as described above, as long as the devices employ a resin having an anion-exchange group.

In view of the above circumstances, the present invention has as its object to provide a new resin having an anion-exchange group and adapted to be dissolved in a mixed solvent of a water-soluble organic solvent and water. Another object of the present invention is to provide: a material including the resin and used for forming an electrochemical device; and an electrochemical device.

Solution to Problem

The present invention provides a resin including a copolymer having a first structural unit represented by formula (1) shown below and/or a second structural unit represented by formula (2) shown below, the copolymer further having a structural unit having a polar group.

In the formulae (1) and (2), $R_1$, $R_2$, $R_5$, and $R_6$ are each independently a hydrogen atom or an alkyl group having 1 to 8 carbon atoms, $R_3$ and $R_4$ are each independently a hydrogen atom or an alkyl group having 1 to 18 carbon atoms, $X_1$ and $X_2$ are each independently a halide ion, a hydroxide ion, or an anion of an organic or inorganic acid, $A_1$ is a structure bonded to a nitrogen atom to form a ring, the structure being a saturated carbon chain having 3 to 7 carbon atoms or a structure resulting from substitution of a heteroatom for a part of the carbon atoms of the saturated carbon chain, and m and n are each independently 0 or 1.

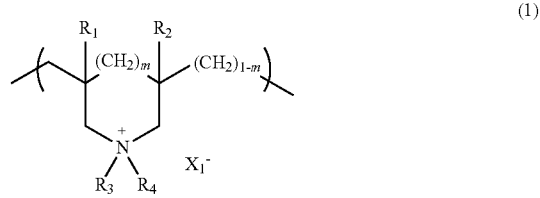

(1)

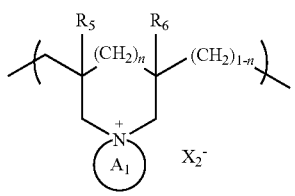

(2)

In another aspect, the present invention provides a resin-containing liquid including the resin according to the present invention and a solvent.

In another aspect, the present invention provides a multilayer body including two or more layers, wherein the layers include a first layer containing the resin according to the present invention.

The multilayer body may be a multilayer body (multilayer body A) in which the two or more layers include a second layer, the second layer has an anion-exchange polymer electrolyte membrane, and the first layer is stacked on the second layer.

The multilayer body may be a multilayer body (multilayer body B) in which the two or more layers include a catalyst layer, and the first layer is stacked on the catalyst layer.

The present invention provides a member for an electrochemical element, the member including the multilayer body B according to the present invention and a base material, wherein the base material, the catalyst layer, and the first layer are stacked in this order.

In still another aspect, the present invention provides an electrochemical element (electrochemical element A) including an anion-exchange polymer electrolyte membrane and an electrode, wherein a principal surface of the anion-exchange polymer electrolyte membrane is in contact with a principal surface of the electrode, and the electrode contains the resin according to the present invention.

In another aspect, the present invention provides an electrochemical element (electrochemical element B) including an anode, a cathode, and a multilayer body including an anion-exchange polymer electrolyte membrane, wherein the multilayer body is the multilayer body A according to the present invention, and the multilayer body A is sandwiched between the anode and the cathode.

In another aspect, the present invention provides an electrochemical device including the electrochemical element A according to the present invention.

In still another aspect, the present invention provides an electrochemical device including the electrochemical element B according to the present invention.

Advantageous Effects of Invention

The present invention can provide: a resin having an anion-exchange group and adapted to be dissolved in a mixed solvent of a water-soluble organic solvent and water; and a resin-containing liquid, a multilayer body, a member, an electrochemical element, and an electrochemical device that include the resin. The resin according to the present invention further has high resistance to alkaline environments (alkali resistance).

DESCRIPTION OF EMBODIMENTS

Figure 1:
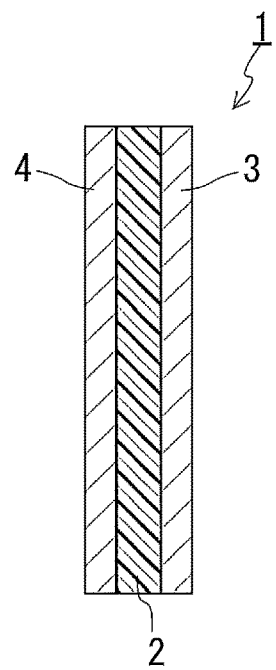
FIG. 1 is a cross-sectional view schematically showing an exemplary membrane-electrode assembly (MEA) which is a preferred example of the electrochemical element according to the present invention.

Hereinafter, embodiments of the present invention will be described. The following description gives examples for illustrating the embodiments of the present invention. It should be noted that the present invention is not limited to the examples described below. For instance, although a PEFC is described below as an exemplary electrochemical device, the present invention is applicable also to electrochemical devices other than PEFCs, including: electrolysis devices such as a hydrogen production device; salt production devices; and water purification devices. The present invention is also applicable to electrochemical elements other than membrane-electrode assemblies (MEAs), although a MEA is described below as an exemplary electrochemical element.

[Resin]

The resin according to the present embodiment includes a copolymer having a first structural unit represented by formula (1) shown below and/or a second structural unit represented by formula (2) shown below, the copolymer further having a structural unit having a polar group. The resin according to the present embodiment may consist essentially of this copolymer or may, if desired, include an additional component together with the copolymer as long as the effect of the present invention is not impaired. Examples of the "additional component" include: copolymers devoid of a part of the structural units essential for the copolymer defined above; styrene; styrene-derivative monomers such as α-methylstyrene; and unsaturated hydrocarbon monomers such as isoprene, butadiene, and isobutene.

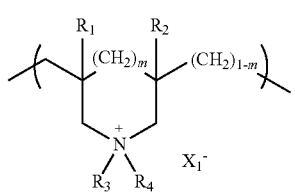

(1)

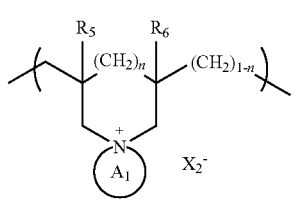

(2)

In the formulae (1) and (2), $R_1$, $R_2$, $R_5$, and $R_6$ are each independently a hydrogen atom or an alkyl group having 1 to 8 carbon atoms. Preferably, $R_1$, $R_2$, $R_5$, and $R_6$ are each independently a hydrogen atom or an alkyl group having 1 to 4 carbon atoms.

$R_3$ and $R_4$ are each independently a hydrogen atom or an alkyl group having 1 to 18 carbon atoms. $R_3$ and $R_4$ are preferably each independently an alkyl group having 1 to 5 carbon atoms, and more preferably each independently an alkyl group having 1 to 4 carbon atoms.

$X_1$ and $X_2$ are each independently a halide ion, a hydroxide ion, or an anion of an organic or inorganic acid.

$A_1$ is a structure bonded to a nitrogen atom to form a ring, the structure being a saturated carbon chain having 3 to 7 carbon atoms or a structure resulting from substitution of a heteroatom for a part of the carbon atoms of the saturated carbon chain. The structure $A_1$ is preferably a saturated carbon chain having 4 to 5 carbon atoms or a structure resulting from substitution of a heteroatom for a part of the carbon atoms of the saturated carbon chain. Examples of the heteroatom include a nitrogen atom and an oxygen atom.

m and n are each independently 0 or 1.

The conducting ionic species in anion-exchange PEFCs is hydroxide ion (OH⁻), and resins used in anion-exchange PEFCs are required to be resistant to decomposition in alkaline environments. Commonly-used anion-exchange resins have a benzylammonium structure, and this structure is prone to undergo nucleophilic substitution reaction involving hydroxide ions.

By contrast, the first structural unit represented by the formula (1) and the second structural unit represented by the formula (2) have no benzylammonium structure (such as benzyltrialkylammonium) and are less likely to undergo nucleophilic substitution reaction involving OH⁻ even when exposed to alkaline environments. Furthermore, the first structural unit and the second structural unit have a structure in which a nitrogen atom is contained in a ring structure and are less likely to undergo an elimination reaction (E2 reaction) originating from the hydrogen atom present at the β-position with respect to the nitrogen atom. This is why an anion-exchange group having the first structural unit and/or second structural unit has high alkali resistance, and deterioration of the quaternary ammonium group is less likely to occur even in a high-temperature environment. The resin according to the present embodiment which has the first structural unit and/or second structural unit is less likely to suffer elimination of the anion-exchange group and has high alkali resistance.

Resins used in PEFCs may have contact with water resulting from the reaction in the PEFCs or water supplied to the PEFCs. To reduce the performance degradation of a PEFC, the resin used in the PEFC preferably has low solubility in water and may be insoluble in water.

Specific examples of the first structural unit represented by the formula (1) include structures represented by formula (5) or (6) shown below. $R_1$ to $R_4$ are as defined above.

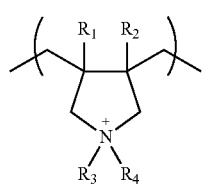

(5)

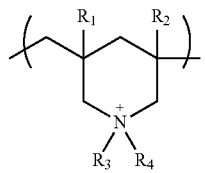

(6)

Specific examples of the second structural unit represented by the formula (2) include structures represented by formula (7) or (8) shown below. $R_5$, $R_6$, and $A_1$ are as defined above.

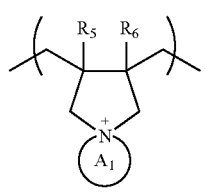

(7)

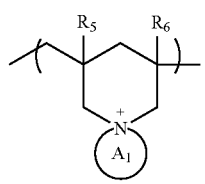

(8)

The structural unit having a polar group is preferably a third structural unit represented by the following formula (3).

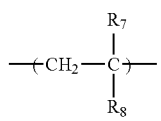

(3)

In the formula (3), $R_7$ is a hydrogen atom or a methyl group and preferably a hydrogen atom. $R_8$ is a hydrophilic polar group, or an alkyl group which has 1 to 8 carbon atoms and in which at least one hydrogen atom is substituted by a hydrophilic polar group. $R_8$ is preferably a hydrophilic polar group, or an alkyl group which has 1 to 3 carbon atoms and in which at least one hydrogen atom is substituted by a hydrophilic polar group. $R_8$ is more preferably a hydrophilic polar group. The hydrophilic polar group is preferably at least one selected from the group consisting of a carboxyl group, a sulfo group, a phosphonate group, a hydroxyl group, an ester group, an ether group, an amide group, and an amino group, and more preferably at least one selected from the group consisting of a carboxyl group, a sulfo group, a phosphonate group, an amino group, and a hydroxyl group. To allow the copolymer to be resistant to water or insoluble in water, the hydrophilic polar group is preferably at least one selected from the group consisting of a carboxyl group and a hydroxyl group.

The copolymer according to the present embodiment preferably further includes a fourth structural unit represented by formula (4) shown below. The inclusion of the fourth structural unit represented by the formula (4) allows adjustment of the solubility of the resin in water.

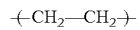

(4)

As for the proportions of the numbers of moles of the first and second structural units, the third structural unit, and the fourth structural unit contained in the resin according to the present embodiment, the sum of the numbers of moles of the first and second structural units may be in the range of 1.1 to 10.5 mol % relative to the total number of moles of the first, second, third, and fourth structural units, the number of moles of the third structural unit may be in the range of 52.9 to 67.9 mol % relative to the total number of moles of the first, second, third, and fourth structural units, and the number of moles of the fourth structural unit may be in the range of 26.0 to 43.5 mol % relative to the total number of moles of the first, second, third, and fourth structural units.

The method for producing the copolymer included in the resin according to the present embodiment is not particularly limited. An example of the method is to copolymerize a monomer represented by formula (9) shown below and/or a monomer represented by formula (10) shown below with a monomer having a polar group. Examples of the monomer having a polar group include monomers represented by formula (11) shown below. Alternatively, a monomer represented by the formula (9) shown below and/or a monomer represented by the formula (10) shown below may be copolymerized with a monomer represented by the formula (11) shown below and a monomer represented by formula (12) shown below. Another example of the method for producing the copolymer included in the resin according to the present embodiment is one in which a polymer having the third structural unit and fourth structural unit is exposed to radiation to produce radicals and then this polymer is immersed and heated in a solution containing a monomer of the formula (9) and/or a monomer of the formula (10). With this method, it is possible to obtain a copolymer that has the first structural unit and/or second structural unit in branches of the polymer having the third structural unit and fourth structural unit.

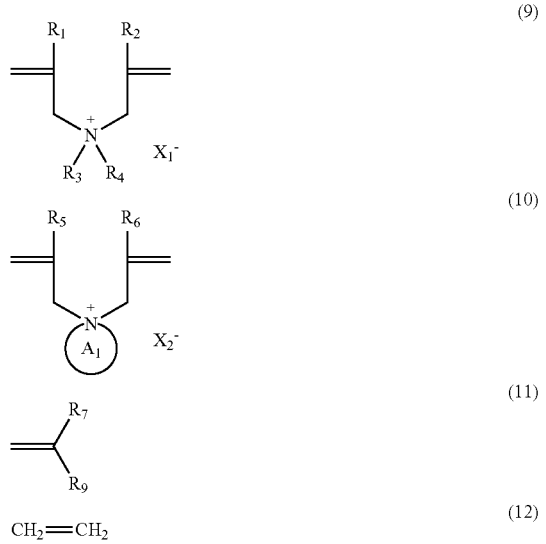

$R_1$ to $R_7$, $A_1$, $X_1$, and $X_2$ are as previously described. $R_9$ is a functional group identical to $R_8$ or a functional group convertible to $R_8$ through a chemical reaction. For example, when $R_8$ is a hydroxyl group, $R_9$ may be a group represented by —O—C(=O)—$R_{9A}$ which can be hydrolyzed to produce a hydroxyl group. $R_{9A}$ is an alkyl group having 1 to 8 carbon atoms and preferably an alkyl group having 1 to 4 carbon atoms.

Counter anions are typically replaced by other anions through ion exchange. The counter anion $X_1$ in the formula (9) and the counter anion $X_2$ in the formula (10) are not particularly limited as long as the anions are not difficult to replace by other anions through ion exchange, and any anions known as counter anions can be employed. For example, $X_1$ and $X_2$ are each independently a halide ion, a hydroxide ion, or an anion of an organic or inorganic acid. Since counter anions are used in the form of hydroxide ions, $X_1$ and $X_2$ are preferably each a hydroxide ion. In terms of the storage stability of the anion-exchange group, it is preferable that $X_1$ and $X_2$ be each independently a halide ion or an anion of an organic or inorganic acid. Examples of the halide ion include fluoride, chloride, bromide, and iodide ions. To achieve high ion-exchange capacity, it is preferable to use a fluoride, chloride, or bromide ion as the halide ion. As the organic acid anion there is preferably used a bistrifluoromethanesulfonimide anion, a thiocyanate anion, or a tetrakis[3,5-bis(trifluoromethyl)phenyl]borate anion. As the inorganic acid anion there is preferably used a carbonate ion, a hydrogen carbonate ion, a tetrafluoroborate anion, or a hexafluorophosphate anion.

The monomers represented by the formulae (9) and (10) have a structure containing an anion-exchange group; thus, the use of these monomers can eliminate the need for a step of adding an anion-exchange group. Specific examples of the monomers represented by the formula (9) or (10) include diallyldimethylammonium chloride (DADMAC) and diallyldimethylammonium-bistrifluoromethanesulfonimide (DADMA-TFSI).

The copolymer included in the resin according to the present embodiment is preferably a graft copolymer including a polymer substrate $S_1$ and a graft chain $G_1$ introduced into the polymer substrate $S_1$. The graft copolymer preferably includes: a polymer substrate $S_1$ having a structural unit having a polar group; and a graft chain $G_1$ having the first structural unit and/or second structural unit. The structural unit having a polar group is preferably the third structural unit. It is more preferable that the polymer substrate $S_1$ further have the fourth structural unit. The structural unit having a polar group and the first, second, third and fourth structural units are as previously described and will therefore not be described again.

It is preferable to use a highly hydrophilic polymer substrate as the polymer substrate $S_1$. When the polymer substrate $S_1$ is a highly hydrophilic polymer substrate, a water absorption ratio of the polymer substrate $S_1$ is preferably more than 0.1% and 100% or less, more preferably 1% or more and 80% or less, even more preferably 2% or more and 60% or less, particularly preferably 4% or more and 40% or less, and most preferably 5% or more and 20% or less. When the water absorption ratio of the polymer substrate $S_1$ is within the above range, graft polymerization for introducing the graft chain $G_1$ into the polymer substrate $S_1$ can easily be accomplished, and deterioration in the mechanical properties of the resulting grafted membrane can be prevented.

The term "water absorption ratio" as used herein refers to the ratio of the difference between the weight of the water-soaked polymer substrate and the weight of the dried polymer substrate to the weight of the dried polymer substrate. The "weight of the dried polymer substrate" refers to the weight of the polymer substrate as measured after the polymer substrate is dried by allowing it to stand at 60° C.

for 2 hours or more. The "weight of the water-soaked polymer substrate" refers to the weight of the polymer substrate as measured after the polymer substrate dried as described above is kept immersed in water maintained at 30° C. for 2 hours or more. Drying the polymer substrate by allowing it to stand at 60° C. for 2 hours or more means drying the polymer substrate until the polymer substrate stops showing any change in weight. The period of time during which the polymer substrate is allowed to stand may be, for example, 2 hours or 3 hours. Saying that the polymer substrate stops showing any change in weight means that the difference between $W_t$ and $W_{t+0.5}$ falls within ±0.5% of $W_t$, where $W_t$ denotes the weight of the polymer substrate as measured after the polymer substrate is dried by allowing it to stand at 60° C. for a predetermined time (t hours) equal to or more than 2 hours, and $W_{t+0.5}$ denotes the weight of the polymer substrate as measured after the polymer substrate thus dried is allowed to stand for another 30 minutes (t+0.5 hours). Keeping the polymer substrate immersed in water maintained at 30° C. for 2 hours or more means keeping the polymer substrate immersed in water until it is determined that the polymer substrate has stopped showing any change in weight on the basis of the same criterion as described above.

The polymer substrate $S_1$ more preferably has at least one selected from the group consisting of a hydroxyl group, a carboxyl group, an ester group, an ether group, an amide group, and an amino group. The polymer substrate $S_1$ may be hydrophilized beforehand. The hydrophilization may be accomplished by a commonly used technique such as corona treatment, plasma treatment, or UV treatment. The hydrophilization may be performed using radiation. A specific example of the hydrophilization is one in which the polymer substrate is exposed to radiation such as electron radiation to form radicals on the polymer substrate, and then a functional group or a polymer having a functional group is introduced onto the polymer substrate by using the produced radicals.

As the material of the polymer substrate $S_1$ there can be used, for example, a resin having a water absorption ratio as specified above, insoluble in water, and stable in alkaline environments. Known resins can be used as long as the effect of the invention is not impaired. Examples of the material of the polymer substrate $S_1$ include: polycarbonate resins; polyester resins such as polyethylene terephthalate; cellulose resins such as cellophane; polyvinyl acetal resins such as polyvinyl formal and polyvinyl butyral; polyamide resins such as nylon; (meth)acrylic resins; urea resins; phenolic resins; melamine resins; epoxy resins; acetal resins (polyacetal); polyvinyl acetate resins; polyvinyl alcohol resins; ethylene-vinyl alcohol copolymer; hydrophilized polyolefin resins; and hydrophilized polystyrene resins. The material of the polymer substrate $S_1$ is preferably a polyvinyl alcohol resin, ethylene-vinyl alcohol copolymer, or hydrophilized polyolefin resin.

Examples of the material of the polymer substrate $S_1$ having the third structural unit and fourth structural unit include ethylene-vinyl alcohol copolymer, ethylene-vinyl acetate copolymer, ethylene-methacrylic acid copolymer, ethylene-methacrylate copolymer, and hydrophilized polyolefin resins. The material of the polymer substrate $S_1$ is particularly preferably ethylene-vinyl alcohol copolymer.

When ethylene-vinyl alcohol copolymer is used as the material of the polymer substrate $S_1$, the ethylene content of the copolymer may be 1 to 99 mol % and is preferably 20 to 50 mol %, even more preferably 25 to 50 mol %, and particularly preferably 30 to 45 mol %. If the ethylene content is excessively low, the solubility in water may be excessively high, while if the ethylene content is excessively high, the graft polymerizability may decrease.

When a polyvinyl alcohol resin is used as the material of the polymer substrate $S_1$, the degree of saponification of the polyvinyl alcohol resin is preferably 70 mol % or more and more preferably 98 mol % or more. If the degree of saponification is excessively low, the resin according to the present embodiment may be readily soluble in water.

The polymer substrate $S_1$ may be crosslinked as long as the effect of the present invention is not impaired. Examples of the method for crosslinking include chemical crosslinking which uses a cross-linker and radiation crosslinking which exploits radicals produced by radiation exposure. Either of these methods may be used alone, or both may be used in combination.

The thickness of the polymer substrate $S_1$ is not particularly limited and is, for example, in the range of 1 to 200 µm. In terms of the solubility of the copolymer, it is preferable that the thickness of the polymer substrate $S_1$ be in the range of 1 to 50 µm. An advantage of the use of the polymer substrate $S_1$ having such a thickness is that the occurrence of damage to the polymer substrate $S_1$ during graft chain formation can be reduced.

Hereinafter, a process using radiation will be described as an example of the method for producing a graft copolymer.

The graft polymerization process using radiation preferably includes a step II of exposing the polymer substrate $S_1$ to radiation and a step III of introducing a graft chain $G_1$ resulting from polymerization of a polymerizable monomer into the radiation-exposed polymer substrate $S_1$ obtained in the step II.

In the graft polymerization process according to the present embodiment, the step II may be preceded by a step I of heating the polymer substrate $S_1$ at a temperature equal to or higher than the glass-transition point of the polymer substrate $S_1$ and equal to or lower than the melting point of the polymer substrate $S_1$. Performing the step of heating the polymer substrate $S_1$ allows a high graft ratio to be achieved in the step of introducing the graft chain $G_1$. A possible reason for this is as follows: The preheated polymer substrate $S_1$ is believed to have a higher crystallinity and a larger crystal size than the polymer substrate $S_1$ not having undergone the heating step, and the exposure of the preheated polymer substrate $S_1$ to radiation is thus believed to yield a higher spin density in the substrate (produce more radicals in the substrate). A resin having a high graft ratio can be dissolved in a mixed solution of a water-soluble organic solvent and water even when the content of water is high in the composition of the mixed solution.

As the radiation applied to the polymer substrate $S_1$ there may be used, for example, ionizing radiation such as α-radiation, β-radiation, γ-radiation, electron radiation, or ultraviolet radiation, and γ-radiation or electron radiation is particularly preferably used. The radiation dose is preferably in the range of 1 to 300 kGy and more preferably in the range of 10 to 100 kGy. If the radiation dose is excessively low, the amount of radicals produced in the polymer substrate by the radiation exposure may be so small that the graft polymerization is difficult to accomplish. If the radiation dose is excessively high, the radiation exposure may cause decomposition of the polymer substrate, or the radiation exposure may produce a larger amount of radicals, leading to excessive polymerization. The polymer substrate exposed to radiation may be stored at a low temperature (for example, −30° C. or lower, preferably −60° C. or lower) to avoid deactivation before graft polymerization.

The polymerizable monomer preferably includes a monomer represented by the formula (9) and/or a monomer represented by the formula (10). The details of these monomers are as previously described. An increase in the number of carbon atoms of $R_1$ to $R_6$ in the formula (9) or (10) leads to a decrease in the polarity of the polymerizable monomer. This results in an increase in the affinity between the polymer substrate $S_1$ and the polymerizable monomer, thus facilitating the formation of the graft chain $G_1$. However, in terms of the polymerizability of the polymerizable monomer and the number of anion-exchange groups per unit weight of the resulting copolymer, it is preferable that the number of carbon atoms of $R_1$ to $R_6$ be small.

The polymerizable monomer per se may be subjected to polymerization, or a solution (polymerizable monomer solution) of the polymerizable monomer dissolved in a solvent may be subjected to polymerization.

The production method according to the present embodiment may use a graft comonomer of at least one monomer selected from monomers represented by formulae (13) to (17) together with the polymerizable monomer.

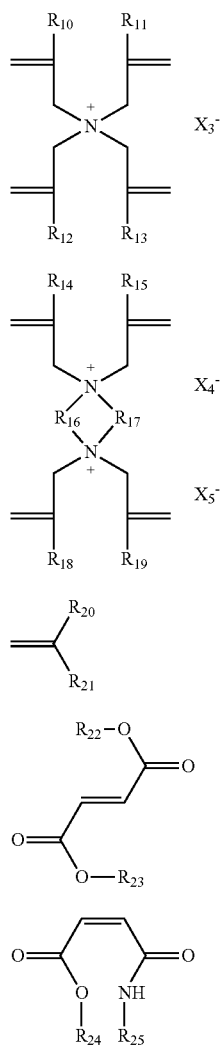

In the formulae (13) to (17), $R_{10}$ to $R_{15}$, $R_{18}$ to $R_{20}$, and $R_{22}$ to $R_{25}$ are preferably each independently a hydrogen atom or an alkyl group having 1 to 8 carbon atoms. $R_{10}$ to $R_{15}$, $R_{18}$ to $R_{20}$, and $R_{22}$ to $R_{25}$ are more preferably each independently a hydrogen atom or an alkyl group having 1 to 4 carbon atoms. Preferably, $R_{16}$ and $R_{17}$ are each independently an alkyl group having 1 to 3 carbon atoms, the total number of carbon atoms of $R_{16}$ and $R_{17}$ is in the range of 2 to 6, and $X_3$ to $X_5$ are each independently a halide ion, a hydroxide ion, or an anion of an organic or inorganic acid. $R_{21}$ is preferably any one of the structures represented by the following formula (18).

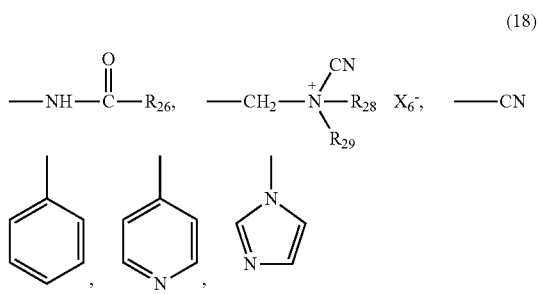

Preferably, in the formula (18), $R_{26}$ to $R_{29}$ are each independently a hydrogen atom or an alkyl group having 1 to 8 carbon atoms, and $X_6$ is a halide ion, a hydroxide ion, or an anion of an organic or inorganic acid.

The use of a graft comonomer represented by the formula (13) and/or a graft copolymer represented by the formula (14) facilitates the introduction of a crosslinked structure into the graft chain $G_1$. The use of such graft comonomers can contribute to an increase in alkali resistance or heat resistance of the graft chain $G_1$.

The preferred content of the graft comonomer represented by the formula (13) and/or the graft copolymer represented by the formula (14) cannot be definitely specified, since the preferred content varies depending on the structure of the graft comonomers, the composition of the graft polymerization solution, the reaction temperature at which the graft polymerization is carried out, and the environment in which the resulting resin is to be used. For example, the content of the graft comonomers is 0.1 to 1000 parts by mass, in particular 0.5 to 800 parts by mass, per 100 parts by mass of the monomers represented by the formulae (9) and (10).

The use of a graft comonomer represented by any one of the formulae (15) to (17) may facilitate the control of the hydrophilicity or hydrophobicity of the graft chain $G_1$ and resin to be formed. Additionally, when the graft chain $G_1$ includes such a graft comonomer, the control of the permeability of a membrane containing the resin according to the present embodiment may be easy.

The content of the graft comonomer represented by any one of the formulae (15) to (17) cannot be definitely specified, since the preferred content of the graft comonomer varies depending on the structure of the monomers represented by the formulae (9) and (10) or the graft comonomer, the composition of the graft polymerization solution, the reaction temperature at which the graft polymerization is carried out, and the environment in which the resulting resin is to be used. For example, the content of the graft comonomer is 1 to 5000 parts by mass, in particular 50 to 2000 parts by mass, per 100 parts by mass of the monomers represented by the formulae (9) and (10).

Examples of the solvent for dissolving the polymerizable monomer include: water; alcohols such as methanol, ethanol, and isopropanol; and aprotic polar solvents such as N,N-dimethylformamide (DMF), N,N-dimethylacetamide (DMAc), dimethyl sulfoxide (DMSO), and N-methylpyrrolidone (NMP). One solvent may be used alone, or two or more solvents may be used in combination.

The concentration of the polymerizable monomer in the polymerizable monomer solution can be varied depending on the polymerizability of the polymerizable monomer and the desired graft ratio and is, for example, 20 wt % or more. If the concentration of the polymerizable monomer is excessively low, the graft polymerization reaction may fail to proceed satisfactorily.

To prevent inhibition of the graft polymerization reaction by the presence of oxygen, it is preferable to remove oxygen from the polymerizable monomer or polymerizable monomer solution by a known method such as bubbling with nitrogen gas or freeze-pump-thaw cycling.

The reaction time during which the graft polymerization is allowed to proceed is, for example, 10 minutes to 12 hours. The reaction temperature at which the graft polymerization is allowed to proceed is, for example, 0 to 90° C., in particular 40 to 80° C. The graft ratio can be controlled depending on the reaction temperature and the reaction time. The graft ratio is preferably controlled, for example, to the range of 5 to 200%. The graft ratio is more preferably controlled, for example, to the range of 5 to 100%, even more preferably controlled to the range of 10 to 100%, and particularly preferably controlled to the range of 15 to 50%. Increasing the graft ratio can lead to an increase in ionic conductivity of the resulting resin. As is conventional, the term "graft ratio" is used herein to refer to the ratio of the mass of the introduced graft chain to the mass of the polymer substrate.

A reaction in a solid-liquid two phase system will now be described as an example of the graft polymerization reaction. First, the polymerizable monomer solution is placed in a container made of glass or stainless steel. To remove oxygen which can inhibit the grafting reaction, the polymerizable monomer solution is bubbled with an inert gas such as nitrogen or is degassed under reduced pressure. Next, the polymer substrate $S_1$ exposed to radiation beforehand was put into the polymerizable monomer solution to allow graft polymerization to take place. Subsequently, the polymer substrate (grafted polymer) having the graft chain $G_1$ introduced as a result of polymerization of the polymerizable monomer is taken out of the solution. To remove the solvent, the polymerizable monomer remaining unreacted, and the polymer formed from the polymerizable monomer, the grafted polymer obtained is washed 2 to 6 times with a solvent and then dried. The solvent used for the washing may be a solvent in which the polymerizable monomer and the polymer formed from the polymerizable monomer are readily soluble and in which the polymer substrate $S_1$ and the grafted polymer are insoluble. For example, acetone, methanol, ethanol, or water can be used.

The ion-exchange capacity of the copolymer included in the resin according to the present embodiment is not particularly limited. To allow the resin to have an ionic conductivity sufficient for use in PEFCs, the ion-exchange capacity of 1 g of the copolymer is, for example, in the range of 0.1 to 5.0 mmol/g, in particular in the range of 0.4 to 2.5 mmol/g. If the ion-exchange capacity is excessively high, the solubility in water may be excessively high. The ion-exchange capacity may be, for example, 0.4 to 2.0 mmol/g. These values of the ion-exchange capacity are those determined by a measurement method described in EXAMPLES below.

[Resin-Containing Liquid]

A resin-containing liquid according to the present embodiment includes the resin according to the present embodiment and a solvent. In the resin-containing liquid according to the present embodiment, the resin according to the present embodiment is preferably dissolved or dispersed in the solvent and more preferably dissolved in the solvent. In other words, the resin-containing liquid according to the present embodiment is preferably a solution or dispersion (suspension) containing the resin according to the present embodiment and particularly preferably a solution containing the resin according to the present embodiment. The solubility of the resin contained in the resin-containing liquid can be specifically determined by a method described below.

The resin according to the present embodiment is as previously described and will therefore not be described again. The resin according to the present embodiment may be crosslinked as long as the effect of the present invention is not impaired. In terms of the stability and homogeneity of the resin-containing liquid, it is preferable that the resin according to the present embodiment be devoid of a crosslinked structure.

An anion-exchange PEFC includes an anion-exchange polymer electrolyte membrane (anion-exchange membrane) and electrodes (cathode and anode). Such an electrode contains a resin having anionic conductivity and a catalyst. The resin contained in the electrode serves to impart anionic conductivity to the electrode and enhance the bond strength between the anion-exchange membrane and the electrode. The electrode is formed using a resin-containing liquid including a resin having an anion-exchange group and an organic solvent in which the resin is dissolved or suspended. The resin-containing liquid according to the present embodiment can be used, for example, for the formation of the electrode.

Generally, a resin having an anion-exchange group which is to be included in a resin-containing liquid used for forming an electrode is required to be successfully dissolved or suspended in an organic solvent and is particularly required to be successfully dissolved in an organic solvent. For example, JP 2009-140783 A discloses a resin having an anion-exchange group and having high solubility in organic solvents such as chloroform, THF (tetrahydrofuran), and 1-propanol. However, such organic solvents traditionally used as solvents for dissolving resins having anion-exchange groups have caused great concern in terms of environmental impact and, in addition, they need to be carefully handled due to their high flammability.

Water does not raise the above concern and is easy to handle. However, if the water solubility of a resin having an anion-exchange group is excessively high, the resin may be dissolved out of an electrode formed from a solution of the resin during electricity generation in a fuel cell including the electrode. Such dissolution can occur because an electrode of an anion-exchange PEFC is exposed to a water-rich environment due to the production of water at the anode of the fuel cell and in some cases due to supply of a liquid fuel including water, such as hydrazine hydrate. Thus, a resin having an anion-exchange group and intended for use in an anion-exchange PEFC is desired to be highly soluble in a solvent that has less environmental impact and is easier to handle than organic solvents and that is not water itself. An example of such a solvent is a mixed solvent of an organic solvent and water, and a specific example is a mixed solvent of water and a water-soluble organic solvent such as methanol or ethanol.

The resin according to the present embodiment preferably has the property of being fully dissolved in a predetermined mixed solvent after the below-described steps 1) to 3) of a solubility test using the mixed solvent. The step 3) of this test is designed in consideration of storage and transportation subsequent to production. The predetermined mixed solvent used can be, for example, a mixed solvent of 50 wt % 1-propanol and 50 wt % water or a mixed solvent of 50 wt % ethanol and 50 wt % water.

1) A resin-containing liquid containing 2 wt % of a resin is prepared using the mixed solvent.

2) The resin-containing liquid prepared in the step 1) is heated and maintained at 60° C. for 24 hours under stirring.

3) After the step 2), the resin-containing liquid is naturally cooled (left to cool) to 23° C. and left as such for 24 hours.

The resin according to the present embodiment is preferably not dissolved in water and more preferably not dissolved or suspended in water after the steps 1) and 2) of the above test are performed using water instead of the mixed solvent. The resin according to the present embodiment is preferably not dissolved in an organic solvent consisting of ethanol or 1-propanol and more preferably not dissolved or suspended in the organic solvent after the steps 1) and 2) of the above test are performed using the organic solvent instead of the mixed solvent.

The solvent contained in the resin-containing liquid according to the present embodiment is preferably a mixed solvent containing a water-soluble organic solvent and water and more preferably a mixed solvent containing water and an organic solvent capable of being mixed with water in any proportion (such an organic solvent may hereinafter be referred to as a "water-miscible organic solvent"). Being a "water-soluble organic solvent" means that the maximum amount of the organic solvent soluble in 1 L of water at 20° C. is 20 g or more. Whether an organic solvent is a water-miscible organic solvent, namely whether the organic solvent is capable of being mixed with water in any proportion, is determined at 20° C. as is the case with the solubility in water.

Examples of the water-soluble organic solvent include: alcohols such as methanol, ethanol, 1-propanol, 2-propanol, 1-butanol, 2-butanol, isobutanol, and tert-butanol; glycol monoethers such as 2-methoxyethanol (ethylene glycol monomethyl ether), 1-methoxy-2-propanol (propylene glycol monomethyl ether), and 1-propoxy-2-propanol (propylene glycol monopropyl ether); glycols such as 1,2-ethanediol (ethylene glycol), 1,2-propanediol (propylene glycol), and 2,2-oxydiethanol (diethylene glycol); and other solvents such as acetone, tetrahydrofuran, dioxane, N,N-dimethylformamide, N,N-dimethylacetamide, and dimethyl sulfoxide. Examples of the water-miscible organic solvent include methanol, ethanol, 1-propanol, 2-propanol, tert-butanol, ethylene glycol, propylene glycol, ethylene glycol monomethyl ether, propylene glycol monomethyl ether, propylene glycol monopropyl ether, diethylene glycol, acetone, tetrahydrofuran, dioxane, N,N-dimethylformamide, and dimethyl sulfoxide. Two or more organic solvents may be used. To facilitate solvent removal, the water-soluble organic solvent preferably has a boiling point of 150° C. or lower and more preferably has a boiling point of 120° C. or lower.

The mixing ratio between the water-soluble organic solvent and water is such that the content of water in the mixed solvent is, for example, 10 wt % or more and 90 wt % or less, 20 wt % or more and 80 wt % or less, or 30 wt % or more and 70 wt % or less. The preferred range of the mixing ratio varies depending on the type of the organic solvent. When an alcohol having 1 to 3 carbon atoms is used as the organic solvent, the content of water in the mixed solvent is preferably 35 wt % or more and 60 wt % or less and more preferably 35 wt % or more and 55 wt % or less.

[Catalyst Electrode Composition, Electrochemical Element (A) Formed Using the Composition, and Electrochemical Device (I) Including the Element (A)]

(Catalyst Electrode Composition)

A catalyst electrode composition according to the present embodiment includes the resin-containing liquid according to the present embodiment and a catalyst, and the catalyst is dispersed in the resin-containing liquid. The catalyst is a catalyst for a chemical reaction occurring at an electrode of an electrochemical element. The resin-containing liquid according to the present embodiment that can be used is as described above. The catalyst used can be a known catalyst for use in PEFCs. The catalyst, unlike catalysts in cation-exchange PEFCs, need not be a noble metal such as platinum, and can be a base metal such as nickel, cobalt, iron, or silver. The catalyst and other substances contained in the anode of a membrane-electrode assembly (MEA) and those contained in the cathode of the MEA may be the same as or different from each other.

(Electrochemical Element (A))

The electrochemical element (A) according to the present embodiment includes an anion-exchange polymer electrolyte membrane and an electrode. The electrode includes a catalyst layer and a gas diffusion layer arranged in this order from the anion-exchange polymer electrolyte membrane. In the electrochemical element (A) according to the present embodiment, a principal surface of the anion-exchange polymer electrolyte membrane is in contact with a principal surface of the electrode. The electrode, in particular the catalyst layer of the electrode, contains a catalyst and the resin according to the present embodiment. The resin according to the present embodiment that can be used is as described above. The anion-exchange polymer electrolyte membrane used in the present embodiment can be a known polymer electrolyte membrane for use in PEFCs. An example of the electrochemical element (A) according to the present embodiment is a membrane-electrode assembly (MEA). The MEA includes an anion-exchange polymer electrolyte membrane and electrodes (an anode and a cathode), and a principal surface of the anion-exchange polymer electrolyte membrane is in contact with a principal surface of the electrodes. The anode and cathode are disposed to sandwich the anion-exchange polymer electrolyte membrane. In this MEA, at least one of the anode and cathode contains a catalyst and the resin according to the present embodiment. The catalyst layer of at least one of the anode and cathode in the MEA can be formed using the catalyst electrode composition according to the present embodiment.

FIG. 1 shows an exemplary electrochemical element. The MEA 1 shown in FIG. 1 includes an anion-exchange polymer electrolyte membrane 2 and electrodes (an anode 3 and a cathode 4) formed on both principal surfaces of the anion-exchange polymer electrolyte membrane 2. The electrodes 3 and 4 are each composed of a catalyst layer and a gas diffusion electrode arranged in this order from the anion-exchange polymer electrolyte membrane 2. The catalyst layer of at least one of the electrodes 3 and 4 preferably contains a catalyst and the resin according to the present embodiment.

(Electrochemical Device (I))

An example of the electrochemical device (I) according to the present embodiment is an anion-exchange PEFC. The electrochemical device (I) according to the present embodiment includes the electrochemical element (A) according to the present embodiment.

Figure 2:
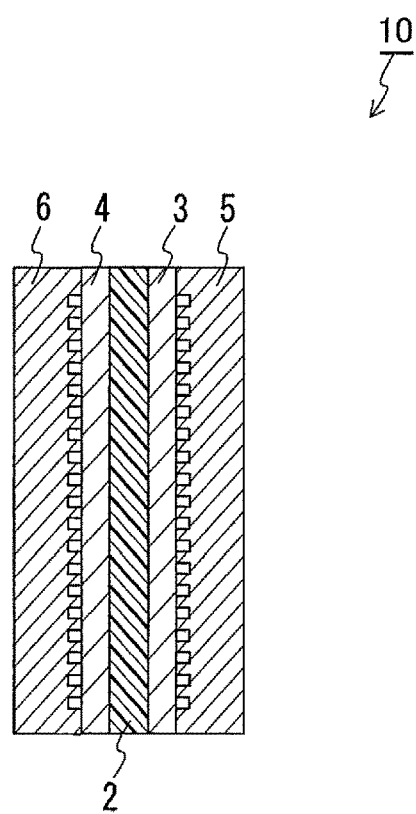
FIG. 2 is a cross-sectional view schematically showing an exemplary PEFC which is a preferred example of the electrochemical device according to the present invention.

FIG. 2 shows an example of the main part of a PEFC. The PEFC 10 shown in FIG. 2 includes a pair of electrodes (an anode 3 and a cathode 4) disposed to sandwich an anion-exchange polymer electrolyte membrane 2 and a pair of separators (an anode separator 5 and a cathode separator 6) disposed to sandwich the pair of electrodes, and these components are joined together by a pressure applied in a direction perpendicular to the principal surfaces of the components. The anion-exchange polymer electrolyte membrane 2 and the electrodes 3 and 4 form a MEA. Also in the PEFC 10, at least one of the electrodes 3 and 4 preferably has a catalyst layer containing a catalyst and the resin according to the present embodiment.

In the PEFC 10, a fuel is supplied to the anode, and an oxidant is supplied to the cathode. The fuel used can be an alkaline fuel containing an alcohol or hydrazine (hydrate). Hydrazine (hydrate) is suitable as the fuel, since it is highly reactive and, according to the electricity generation principle, does not produce carbon dioxide. The oxidant is, for example, oxygen in air.

The components other than the electrochemical element (A) in the electrochemical device (I) according to the present embodiment are not particularly limited. For example, a configuration of a known PEFC can be employed. That is, the PEFC may include, as appropriate, a fuel feeder, an oxidant feeder, a humidifier, a current collecting plate, a temperature sensor, an oxygen sensor, a flow meter, and a humidity sensor. The PEFC can be produced by a known method.

[Multilayer Body, and Electrochemical Element (B), Member, and Electrochemical Device (II) that Include the Multilayer Body]

(Multilayer Body)

A multilayer body according to the present embodiment includes two or more layers, and the two or more layers include a first layer containing the resin according to the present embodiment. The first layer, which contains the resin according to the present embodiment, is less likely to suffer a decrease in the amount of the anion-exchange group even when used in an alkaline environment, and thus exhibits high alkali resistance. The multilayer body according to the present embodiment can be used, for example, as an anion-exchange membrane.

In anion-exchange PEFCs, water is produced by a reaction at the anode, and a liquid fuel may be supplied to the anode together with water. Additionally, in anion-exchange PEFCs, water is necessary for a reaction at the cathode, and water may therefore be supplied to the cathode together with air. Thus, to maintain the performance of a PEFC, it is preferable to prevent dissolution of the first layer, and it is therefore preferable that the first layer be insoluble in water.

The thickness of the first layer can be varied depending on, for example, the electricity generation conditions and the configuration of the MEA. The thickness of the first layer is preferably in the range of 0.1 μm to 20 μm and more preferably in the range of 0.5 μm to 15 μm. In particular, when a multilayer body including the first layer having such a thickness is used in a MEA, it is possible to reduce the increase in resistivity of the first layer, achieve high chemical durability, and prevent defects such as pinholes.

The resin according to the present embodiment may be crosslinked to increase the strength of the first layer. The method used for crosslinking can be a known method such as chemical crosslinking, electron radiation crosslinking, or physical crosslinking. For example, when the resin according to the present embodiment is a graft copolymer having the polymer substrate $S_1$ and the graft chain $G_1$, the polymer substrate $S_1$ preferably has a crosslinked structure. When ethylene-vinyl alcohol copolymer is used as the material of the polymer substrate $S_1$, aldehyde crosslinking can be performed using hydroxy groups of the polymer substrate $S_1$. The polymer substrate $S_1$ having a crosslinked structure can offer the advantage of reduced swelling of the multilayer body.

The ion-exchange capacity of the first layer is preferably in the range of 0.1 to 2 mmeq/g and more preferably in the range of 0.3 to 1.8 mmeq/g. When the first layer having such an ion-exchange capacity is used, water can be retained in the first layer, and this water can be exploited for a reaction at the cathode. The use of such a first layer can contribute to improvement in the ionic conductivity of a MEA and thereby contribute to improvement in the electricity generation efficiency of a PEFC. If the ion-exchange capacity is excessively high, the first layer may have a low mechanical strength and tend to be broken. In addition, the first layer may retain an excess amount of water so that there may occur flooding phenomenon in which the excess amount of retained water inhibits the electrochemical reaction in the PEFC.

Anion-exchange membranes for use in MEAs of anion-exchange PEFCs are required to have alkali resistance. The use of the multilayer body according to the present embodiment which includes the first layer allows the first layer, which has high alkali resistance, to be easily incorporated in a MEA. The multilayer body according to the present embodiment includes the first layer having high alkali resistance and is less likely to suffer deterioration, alteration, or decomposition of the anion-exchange group contained as a functional group. The use of the multilayer body according to the present embodiment can contribute to an increase in resistance to alkaline environments. The use of the multilayer body according to the present embodiment can contribute to the maintenance of the performance of a MEA and therefore the maintenance of the electricity generation efficiency of a PEFC.

The multilayer body can be produced by a known method. Examples of the method include: a method in which two or more layers are individually formed first and then these layers are stacked together; and a method in which a first layer-forming solution is applied and dried on another layer to form a multilayer body having the first layer stacked on the other layer. For example, the resin-containing liquid according to the present embodiment can be used as the first layer-forming solution. The first layer-forming solution used may be prepared by dissolving a previously formed first layer in a solution. The application of the solution can be accomplished by spray coating, screen printing, gravure printing, die coating, or comma coating. The application technique can be selected as appropriate depending on, for example, the viscosity of the solution, the vapor pressure and boiling point of the solvent, and the desired thickness of the first layer. The resin-containing liquid according to the present embodiment that can be used is as described above.

When the method in which the first layer-forming solution is applied is used, the solvent contained in the solution can be any solvent in which the material for forming the first layer is soluble or dispersible. Examples of such a solvent include: alcohols such as methanol, ethanol, 1-propanol, 2-propanol, 1-butanol, 2-butanol, isobutanol, tert-butanol, 1-pentanol, 2-pentanol, 3-pentanol, isopentanol, tert-amyl alcohol, and neopentyl alcohol; glycol monoethers such as 2-methoxyethanol (ethylene glycol monomethyl ether or methyl glycol), 2-(2-methoxyethoxy)ethanol (methyl diglycol), 1-methoxy-2-propanol (propylene glycol monomethyl ether), and 1-propoxy-2-propanol (propylene glycol monopropyl ether); glycols such as 1,2-ethanediol (ethylene glycol), 1,2-propanediol (propylene glycol), and 2,2-oxydiethanol (diethylene glycol); and other solvents such as acetonitrile, N,N-dimethylformamide, N,N-dimethylacetamide, N-methylpyrrolidone, dimethyl sulfoxide, acetone, methyl ethyl ketone, methyl acetate, ethyl acetate, propyl acetate, isopropyl acetate, butyl acetate, isobutyl acetate, tert-butyl acetate, sec-butyl acetate, diethyl ether, tetrahydrofuran, 1,4-dioxane, chloroform, methylene chloride, carbon tetrachloride, benzene, toluene, xylene, and hexane. One of these solvents may be used alone, or a mixture of two or more of the solvents may be used. To facilitate the formation of the first layer, it is preferable to use a highly volatile organic solvent.

To reduce the environmental impact and reduce the risk of fire or explosion, the above solvent is preferably a mixed solvent containing a water-soluble organic solvent and water and more preferably a mixed solvent containing water and an organic solvent capable of being mixed with water in any proportion. The water-soluble solvent is preferably a solvent having a solubility in water at 20° C. of 20 g/L or more, more preferably a solvent having a solubility in water at 20° C. of 50 g/L or more, and even more preferably a solvent (water-miscible organic solvent) capable of being mixed with water in any proportion. The water-soluble organic solvent, the water-miscible organic solvent, and the boiling point of the solvents are as previously described and will therefore not be described again.

The preferred mixing ratio between water and a water-soluble organic solvent in a mixed solvent containing the water-soluble organic solvent and water is as previously described and will therefore not be described again. It is not preferable that the content of water be excessively low, in terms of reduction in the environmental impact, reduction in the stress on the human health, and reduction in the risk of fire or explosion. If the content of water is excessively high, the first layer may be dissolved and thus may fail to retain its shape.

The thickness of the multilayer body according to the present embodiment is preferably in the range of 5 μm to 150 μm and more preferably in the range of 10 μm to 100 μm. The use of the multilayer body having such a thickness can reduce the occurrence of defects such as pinholes and can lower the membrane resistance.

Hereinafter, a multilayer body (A) and a multilayer body (B) will be described as embodiments of the multilayer body.

(Multilayer Body (A))

In the multilayer body (A) according to the present embodiment, the two or more layers can include the second layer described below. The first layer is more preferably stacked on the second layer. The multilayer body (A) according to the present embodiment may include a plurality of the first layers and may include a plurality of the second layers. Specifically, the multilayer body (A) according to the present embodiment may be a membrane composed of the first layer (1), the second layer, and the first layer (2) that are stacked in this order or may be a membrane composed of the second layer (1), the first layer, and the second layer (2) that are stacked in this order.

The multilayer body (A) can be produced, for example, by a method in which the first layer and the second layer are individually formed and then these layers are stacked together or by a method in which a first layer-forming solution is applied and dried on a principal surface of the second layer to form a multilayer body having the first layer stacked on the second layer.

To have high anionic conductivity, the second layer preferably has an anion-exchange polymer electrolyte membrane (anion-exchange membrane). The anion-exchange polymer electrolyte membrane has a functional group having anionic conductivity. The functional group having anionic conductivity is an anion-exchange group and is preferably at least one selected from the group consisting of an amino group (primary, secondary, or tertiary amino group), a quaternary ammonium salt group, a pyridyl group, an imidazole group, a quaternary pyridinium salt group, a sulfonium salt group, and a phosphonium salt group.

A known anion-exchange membrane can be used as the anion-exchange polymer electrolyte membrane included in the second layer; for example, a pore-filled membrane or a grafted membrane can be used. A pore-filled membrane is a membrane including a porous polymer membrane whose pores are filled with a polymer electrolyte, and the filling polymer electrolyte has an anion-exchange group. When the second layer includes a grafted membrane, this grafted membrane preferably includes a polymer substrate $S_2$ and an anion-conductive graft chain $G_2$, the graft chain $G_2$ having a functional group having anionic conductivity.

The following description uses a grafted membrane as an example, but is not intended to limit the anion-exchange polymer electrolyte membrane included in the second layer to a grafted membrane. The following description uses radiation graft polymerization as an example of the method for producing the grafted membrane included in the second layer according to the present embodiment, but is not intended to limit the method for producing the grafted membrane to radiation graft polymerization.

A polymer substrate that can be subjected to radiation graft polymerization is usable as the polymer substrate $S_2$, and examples of the usable polymer substrate include a substrate composed of a hydrocarbon polymer such as polyethylene and a substrate composed of a fluorine-containing polymer. It is preferable to use a substrate composed of a hydrocarbon polymer. The polymer substrate $S_2$ is preferably composed of at least one selected from polyolefin, polystyrene, and polyetherketone.

The radiation used may be, for example, ionizing radiation such as α-radiation, β-radiation, γ-radiation, electron radiation, or ultraviolet radiation, and is particularly preferably γ-radiation or electron radiation. The radiation dose is preferably in the range of 1 to 300 kGy and more preferably in the range of 10 to 100 kGy. If the radiation dose is excessively low, the amount of radicals produced in the polymer substrate by the radiation exposure may be so small that the graft polymerization is difficult to accomplish. If the radiation dose is excessively high, the radiation exposure may cause decomposition of the polymer substrate, or the radiation exposure may produce a larger amount of radicals, leading to excessive polymerization. The polymer substrate exposed to radiation may be stored at a low temperature (for example, −30° C. or lower, preferably −60° C. or lower) to avoid deactivation before graft polymerization.

The graft chain $G_2$ may be introduced using a grafting monomer having a functional group having anionic conductivity, or a functional group having anionic conductivity may be introduced into the graft chain resulting from graft polymerization. The grafting monomer preferably has a carbon-carbon unsaturated bond and a moiety capable of introducing a functional group having anionic conductivity. The functional group having anionic conductivity is as exemplified above.

An example of the graft chain $G_2$ is a polymer chain having a quaternary ammonium group. Quaternary ammonium groups are preferred due to their high anionic conductivity. The introduction of a quaternary ammonium group into the graft chain can be accomplished, for example, by forming a polymer chain as the graft chain from a monomer having a halogenated alkyl group and then performing quaternization in which the halogenated alkyl group is reacted with an amine (tertiary amine). In this quaternization, there takes place a nucleophilic substitution reaction which is a halogen-exchange reaction leading to alkylation of the tertiary amine. The graft chain typically has a quaternary ammonium group in its side chain.

The thickness of the second layer is preferably in the range of 5 μm to 130 μm and more preferably in the range of 12 μm to 70 μm. The use of the second layer having such a thickness can result in a multilayer body that has low membrane resistance, that has a low incidence of membrane breakage, and that is less likely to suffer defects such as pinholes. The polymer substrate $S_2$ tends to thicken as a result of the graft polymerization step and anion-exchange group introduction step. Thus, the thickness of the polymer substrate $S_2$ is preferably in the range of 5 μm to 100 μm and more preferably in the range of 10 μm to 50 μm.

(Electrochemical Element (B) Including Multilayer Body (A))

Figure 3:
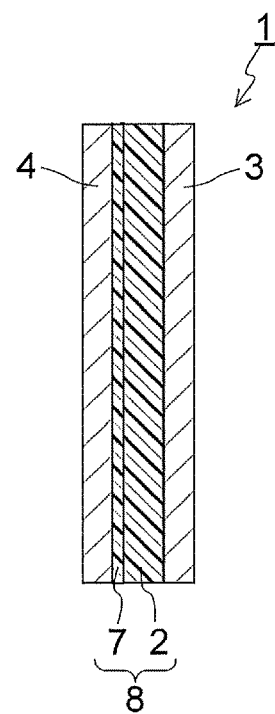
FIG. 3 is a cross-sectional view schematically showing another exemplary MEA according to the present invention.

The multilayer body (A) according to the present embodiment can be used to form an electrochemical element (B). An example of the electrochemical element (B) is a membrane-electrode assembly (MEA) for use in an anion-exchange PEFC. The MEA according to the present embodiment includes an anode, a cathode, and a multilayer body including an anion-exchange polymer electrolyte membrane, and the multilayer body is the multilayer body (A) according to the present embodiment. The multilayer body (A) according to the present embodiment includes a first layer and a second layer. The first layer includes the resin according to the present embodiment, the second layer includes an anion-exchange polymer electrolyte membrane, and a principal surface of the first layer is in contact with a principal surface of the second layer. The multilayer body (A) is sandwiched between the anode and the cathode. Typically, the multilayer body (A) and the electrodes are assembled together by a technique such as hot press. FIG. 3 shows an exemplary MEA including the multilayer body (A) according to the present embodiment. The MEA 1 shown in FIG. 3 includes an anion-exchange polymer electrolyte membrane 2 as a second layer, an anode 3, a cathode 4, and a first layer 7 disposed between the anion-exchange polymer electrolyte membrane 2 and the cathode 4. The first layer 7 and the anion-exchange polymer electrolyte membrane 2 form a multilayer body 8. The multilayer body 8 is sandwiched between the anode 3 and the cathode 4.

In the MEA including the multilayer body (A) according to the present embodiment, a principal surface of the first layer 7 included in the multilayer body (A) is preferably in contact with a principal surface of the cathode 4. When the multilayer body (A) is used in this manner, it is possible to reduce degradation of the multilayer body (A) which can be caused at the interface between the cathode and multilayer body (A) by the fact that hydroxide ions contained in a fuel passing through the multilayer body (A) from the anode side to the cathode side and hydroxide ions resulting from oxygen reduction reaction at the cathode accumulate in the cathode side of the multilayer body (A). When the multilayer body (A) is used in the manner as described above, the multilayer body (A) exhibits high water retention ability at its principal surface in contact with the cathode and is capable of retaining water necessary for the reaction at the cathode. This can lead to an increase in the output of the cell.

(Multilayer Body (B))

The multilayer body (B) according to the present embodiment has two or more layers, and the two or more layers include a catalyst layer and a first layer containing the resin according to the present embodiment. It is more preferable that the first layer be stacked on the catalyst layer. The catalyst layer constitutes a part of an electrode. The resin and first layer according to the present embodiment are as previously described and will therefore not be described again.

The catalyst layer used can be a catalyst layer which is included in known MEAs for use in PEFCs. The thickness of the catalyst layer is preferably in the range of 1 μm to 300 μm, more preferably in the range of 3 μm to 200 μm, and even more preferably in the range of 5 μm to 100 μm. When the thickness of the catalyst layer is in the above range, the catalyst can be evenly distributed in the catalyst layer so that the catalyst layer has high durability. The use of this catalyst layer in a PEFC leads to high output of the PEFC. The use of the catalyst layer having a thickness as specified above leads to a reduction in material cost. If the catalyst layer is excessively thick, there may occur a deterioration in fuel-air diffusivity and an increase in resistance.

The multilayer body (B) can be produced, for example, by a method in which the first layer is separately formed and then stacked on the catalyst layer, or by a method in which a first layer-forming solution containing the first structural unit and/or second structural unit is applied to a principal surface of the catalyst layer to form the multilayer body (B) having the first layer stacked on the catalyst layer.

The catalyst layer generally contains an inorganic material and carbon, and is less swollen by absorption of water or a solvent than anion-exchange membranes. The catalyst layer has an uneven structure and/or a porous structure, and the rate of evaporation of water or a solvent absorbed in the catalyst layer tends to be high. Thus, even with the use of the method in which a first layer-forming solution is applied to a principal surface of the catalyst layer to form the first layer, the first layer can relatively easily be formed to be uniform. This method is also preferred in that it is usable even when the first layer cannot be formed as a self-supporting film.

(Member for Electrochemical Element that Includes Multilayer Body (B))

The member for an electrochemical element according to the present embodiment is, for example, a gas diffusion electrode including the multilayer body (B) and a gas diffusion layer. A first principal surface of the gas diffusion layer is in contact with a principal surface of the catalyst layer included in the multilayer body (B).

The gas diffusion layer used can be a known gas diffusion layer for use in PEFCs. For example, "SIGRACET" manufactured by SGL Carbon SE or "TORAYCA" manufactured by Toray Industries, Inc. can be used.

In another embodiment, the member for an electrochemical element includes the multilayer body (B) and a base material, and the base material, the catalyst layer, and the first layer are stacked in this order. This base material is a base material for transfer. The member for an electrochemical element according to the present embodiment can be used as a catalyst layer transfer sheet for producing a MEA for use in fuel cells. A first principal surface of the base material is in contact with a principal surface of the catalyst layer included in the multilayer body (B).

The base material for transfer can be a known base material for use in catalyst layer transfer sheets, and a sheet having high releasability can be used. Examples of the material of the base material for transfer include polytetrafluoroethylene and tetrafluoroethylene-hexafluoropropylene copolymer.

The member for an electrochemical element according to the present embodiment can be produced by a known method, as long as the effect of the invention is not impaired. Specifically, a method can be used in which a catalyst ink (catalyst electrode composition) for forming an electrode is applied and dried on a base material for transfer and then the first layer is formed on a principal surface of the resulting electrode. The catalyst ink used can be a known catalyst ink for use in PEFCs. The catalyst ink includes, for example, an ionomer solution (a solution prepared by dissolving in a solvent a resin including an ion-conductive polymer material) and an electrode. The method for forming a MEA using a catalyst layer transfer sheet is more advantageous in terms of high flexibility in process design than a method in which a catalyst ink is applied to a polymer electrolyte membrane or gas diffusion layer. Specifically, the method for forming a MEA using a transfer sheet, which does not involve application of a catalyst ink to a polymer electrolyte membrane or gas diffusion layer, is less limited by various factors such as swelling of the polymer electrolyte membrane caused by absorption of water or a solvent, thermal contraction, the porosity of the gas diffusion layer, and the permeability to water or a solvent.

(Electrochemical Device (II))

Figure 4:
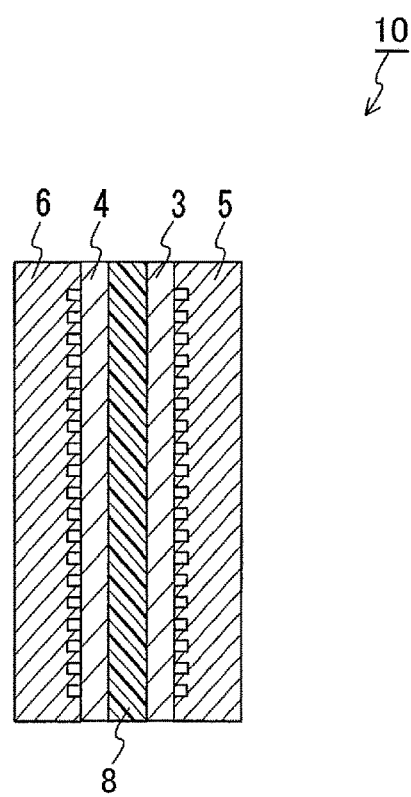
FIG. 4 is a cross-sectional view schematically showing another exemplary PEFC according to the present invention.

FIG. 4 shows an exemplary electrochemical device including the electrochemical element (B) according to the present embodiment. The PEFC 10 shown in FIG. 4 includes a pair of electrodes (an anode 3 and a cathode 4) disposed to sandwich a multilayer body 8 and a pair of separators (an anode separator 5 and a cathode separator 6) disposed to sandwich the pair of electrodes, and these components are joined together by a pressure applied in a direction perpendicular to the principal surfaces of the components. The multilayer body 8 is the multilayer body (A) according to the present embodiment. The multilayer body 8 and the electrodes 3 and 4 form a MEA 1.

When a principal surface of at least one of the electrodes is in contact with a principal surface of the first layer in the electrochemical element (B) according to the present embodiment, alkali-induced deterioration, alteration, or decomposition of the functional group at the interface between the electrolyte membrane and the electrode can be prevented, which can contribute to improvement in the stability and durability of an electrochemical device.

In particular, in some anion-exchange PEFCs using a liquid fuel, an alkali agent such as potassium hydroxide is supplied to the anode together with the liquid fuel. In such an anion-exchange PEFC using a liquid fuel, the alkali agent supplied to the anode of the PEFC comes into contact with the anode side of the anion-exchange membrane. The contact of high concentration of alkali with the anode side of the anion-exchange membrane can cause deterioration of the anion-exchange group at the anode side of the anion-exchange membrane. In the electrochemical device (II) according to the present embodiment, the use of the electrochemical element (B) can prevent a phenomenon such as the deterioration of the anion-exchange group at the anode side of the anion-exchange membrane.

In anion-exchange PEFCs using a liquid fuel, an alkali contained in the liquid fuel may be transported to the cathode side when the liquid fuel passes through the anion-exchange membrane from the anode side to the cathode side. The transported alkali may accumulate at the cathode side of the anion-exchange membrane. Additionally, the cathode in the anion-exchange PEFC is likely to become dry during electricity generation since water is consumed in the oxygen reduction reaction at the cathode. Furthermore, the cathode is likely to be exposed to a high-concentration alkaline environment since the reaction at the cathode produces anions ($OH^-$). This may accelerate the degradation of the cathode side of the anion-exchange membrane. The use of the electrochemical element (B) according to the present embodiment can prevent a phenomenon such as the deterioration of the anion-exchange group at the cathode side of the anion-exchange membrane. The first layer can have high water retention ability at its principal surface in contact with the cathode and is thus capable of retaining water necessary for the reaction at the cathode. This can lead to an increase in the output of the cell.

EXAMPLES

Hereinafter, the present invention will be described in more detail with reference to examples, to which the present invention is not limited. The term "room temperature" as used in this specification refers to a temperature of 23° C.

Abbreviations of various materials used in Examples and Comparative Examples are listed below.

DADMAC: Diallyldimethylammonium chloride
EVOH: Ethylene-vinyl alcohol copolymer
EVOH (44): Ethylene-vinyl alcohol copolymer (ethylene content=44 mol %)
EVOH (32): Ethylene-vinyl alcohol copolymer (ethylene content=32 mol %)
EVOH (29): Ethylene-vinyl alcohol copolymer (ethylene content=29 mol %)

In Examples and Comparative Examples, various properties were measured by the following methods.

(Ion-Exchange Capacity)

Each of the $HCO_3$-type resins obtained in Examples and Comparative Examples was immersed in a 3 mol/L (23° C.) aqueous solution of sodium chloride for 10 hours or more to change the counter anions of the resin to chloride ions. This resin was then dried at 80° C. for 1 hour, after which its weight W [g] was measured. The dried resin was immersed in a 1 mol/L aqueous solution of sodium nitrate ($NaNO_3$) for 12 hours or more. The liberated chloride ions (A [mol]) were titrated with a 0.05 mol/L aqueous solution of silver nitrate ($AgNO_3$) using a potentiometric titrator (COM-2500, manufactured by HIRANUMA SANGYO Co., Ltd.) to measure the ion-exchange capacity. The ion-exchange capacity (IEC) [mmol/g] was determined by the following equation.

Ion-exchange capacity (IEC) [mmol/g]=$A$ [mol]×1000/$W$ [g]

(Ionic Conductivity)

Each of the $HCO_3$-type resins obtained in Examples and Comparative Examples was used to prepare a resin-containing liquid, and the resin-containing liquid containing the $HCO_3$-type resin was poured onto a Petri dish made of fluorine resin. The liquid was then dried at 60° C. to fabricate a cast membrane. The obtained cast membrane was cut into a 10-mm-wide piece, which was placed in water at 60° C. After 1 hour, the alternating-current impedance of the membrane was measured by a four-terminal method using a LCR meter (Chemical Impedance Meter 3532-80, manufactured by HIOKI E.E. CORPORATION). The measurement frequency range was from 10 kHz to 1 MHz. The real part of the measured impedance was plotted on the abscissa, and the imaginary part of the measured impedance was plotted on the ordinate. The real part of a minimum value was employed as a membrane resistance R [Q]. The ionic conductivity [mS/cm] was determined by the following equation, where t denotes the thickness [μm] of the membrane, h denotes the width [cm] of the membrane, and L denotes the distance [cm] between the voltage measurement terminals.

Ionic conductivity [mS/cm]=($L$ [cm]×$10^3$)/($R$ [Ω]×$t$ [μm]×$h$ [cm]×$10^{-4}$)

(Solubility)

Each resin was mixed with a solvent to prepare a resin-containing liquid, in which the amount of the resin was 2 wt % relative to the total weight of the solvent and the resin. The solvent used was a mixed solvent of water and ethanol (water:ethanol=50 wt %:50 wt %) or a mixed solvent of water and 1-propanol (the mixing ratio was as shown in Table 3).

The resin-containing liquid containing 2 wt % of the resin was heated to a temperature of 60° C., and the liquid was then allowed to keep the temperature of 60° C. under stirring for 24 hours. The resulting state is referred to as "State 1". The liquid in "State 1" was naturally cooled to room temperature (23° C.) and then allowed to stand for 24 hours. The resulting state is referred to as "State 2". The resin-containing liquid was rated as "A" when the resin was fully dissolved in State 2, as "B" when the resin was fully dissolved in State 1 but became suspended in State 2, as "C" when the resin was suspended in State 1, or as "D" when the resin remained undissolved without dissolution or suspension in State 1. The evaluation was made by visual inspection.

(Measurement of Functional Group Retention)

The sample was set so that its principal surface to be subjected to measurement faced upward, and depth profiling was performed by TOF-SIMS (time-of-flight secondary ion mass spectrometry) using "FRIFT V" manufactured by ULVAC-PHI, Inc. to analyze the structures present in the sample. On the basis of the analysis result, a relative intensity of the peak attributed to $C_6H_{14}N+$ (amine or ammonium component) was calculated using as a reference the intensity of the peak attributed to $C_2H_3+$ (peak attributed to organic substances generally). $C_6H_{14}N+$ is a structure contained in polymer electrolyte membranes (second layers) used in Examples and Comparative Examples, and a higher retention of the peak attributed to this structure means that the degradation of the polymer electrolyte membrane is more reduced.

Two membranes were prepared as samples for functional group retention measurement in each of Examples and Comparative Examples. One of the two membranes was used as "sample not subjected to simulated durability test", for which the intensity of the peak attributed to the functional group was measured. The other membrane was subjected to a simulated durability test described below, and the intensity of the peak attributed to the functional group was then measured for this membrane (which is referred to as "sample subjected to simulated durability test"). In the measurement on the sample subjected to simulated durability test, the multilayer body composed of the first layer and second layer, or the second layer, was removed as a sample from the MEA after the durability test, and the sample was subjected to the above measurement. When the sample to be subjected to the measurement was the multilayer body, structures were analyzed at a depth of 100 nm in the second layer from the interface between the first layer and the second layer. In Examples, when the sample available consisted only of the second layer, for example, due to separation during removal, the relative intensity of the peak attributed to the functional group was determined at a depth of 100 nm in the second layer from the surface of the second layer that had been in contact with the first layer. For a single-layer membrane obtained in Comparative Example, the principal surface of the membrane that had been in contact with the cathode was subjected to the measurement to determine the relative intensity of the peak attributed to the functional group.

The functional group retention was determined by the following equation using the calculated values of the relative peak intensity and was used as an index of the alkali resistance.

Functional group retention (%)=(Relative intensity of peak attributed to functional group in sample subjected to simulated durability test)×100/ (Relative intensity of peak attributed to functional group in sample not subjected to simulated durability test)

(Simulated Durability Rest)

Figure 5:
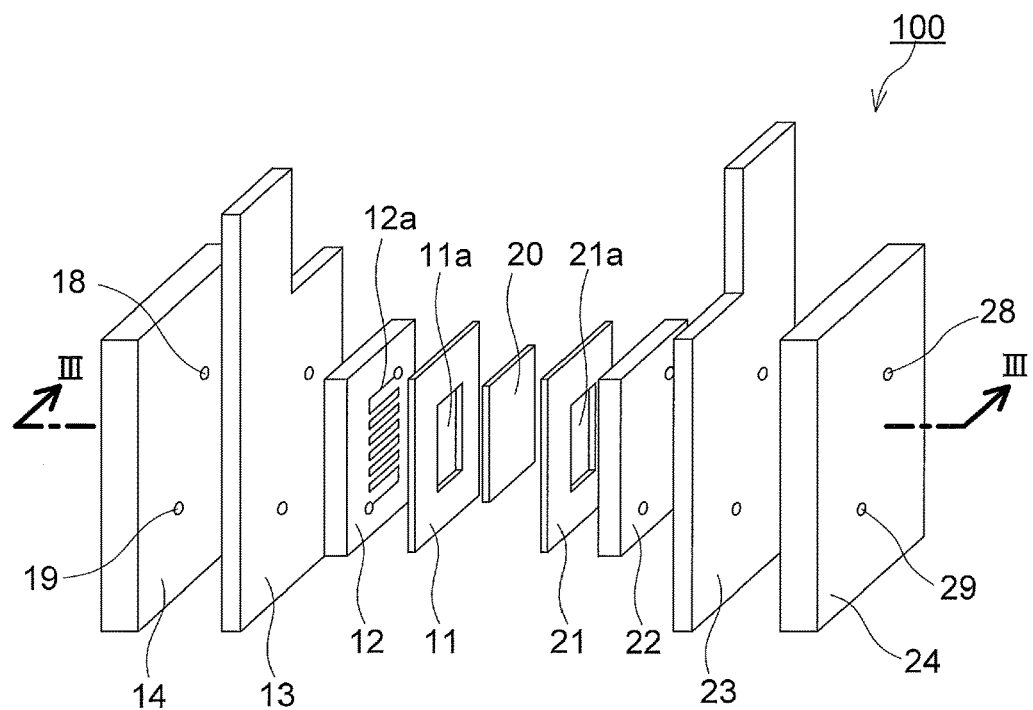
FIG. 5 is an exploded perspective view schematically showing a testing cell used for a simulated durability test.
Figure 6:
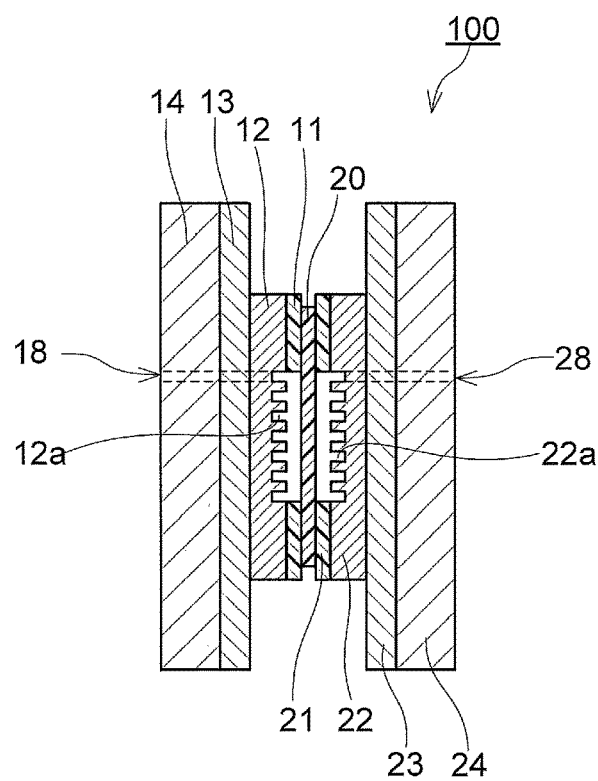
FIG. 6 is a schematic vertical cross-sectional view of the testing cell along plane III-III in FIG. 5.

A membrane 20 for simulated durability test (a multilayer body prepared in Example 2-1, a single-layer membrane prepared in Comparative Example 2-1, or a test specimen prepared for simulated durability test in Example 3-1 or Comparative Example 3-1) was inserted alone in a cell for fuel cell testing which is shown in FIG. 5 and FIG. 6, and was subjected to a simulated durability test. In the cell, the membrane for simulated durability test was sandwiched between a pair of gaskets 11 and 12 respectively having 4-$cm^2$ rectangular openings 11a and 21a, and a pair of separators 12 and 22 respectively having flow paths 12a and 22a, a pair of current collecting plates 13 and 23, and a pair of end plates 14 and 24 were arranged in this order outwardly from the pair of gaskets. These components were fastened together by fixing means such as bolts (not shown) to prevent leakage of air or water through gaps between the contact surfaces of the components. In this manner, a cell 100 for simulated durability test was assembled. This testing cell 100 was provided with flow paths 18 and 19 for supply and discharge of water and flow paths 28 and 29 for supply and discharge of dry air. The flow paths 18, 19, 28, and 29 originate from the openings of the end plates 14 and 24, pass through the end plates 14 and 24, the current collecting plates 13 and 23, and the separators 12 and 22, and lead to the flow paths 12a and 22a.

The testing cell 100 was set so that the principal surfaces of the membrane for simulated durability test were parallel to the vertical direction. The cell 100 for simulated durability test was heated to a temperature of 60° C. A fuel (10% hydrazine hydrate+1N potassium hydroxide (KOH)) was continuously supplied to the anode at a rate of 2 cc/min for 5 hours, during which dry air was continuously supplied to the cathode at a rate of 1000 ml/min. The membrane subjected to the simulated durability test was removed from the cell, washed with ultrapure water, and then subjected to bubbling with carbon dioxide gas in ultrapure water for 30 minutes to change the counter ion of the functional group to carbonate ion species. This membrane was used as a "sample subjected to simulated durability test" for the measurement of the functional group retention.

(Graft Ratio)

The graft ratio was calculated by the following equation.

Graft ratio (%)=100×($W_1$−$W_0$)/$W_0$ $W_0$ is the dry weight (g) of the substrate not subjected to graft polymerization, and $W_1$ is the dry weight (g) of the membrane resulting from graft polymerization. The "dry" weight refers to the weight of the substrate or membrane as determined after the substrate or membrane was placed at 60° C. for 1 hour or more and stopped showing any change in weight.

Example 1-1

A 20-μm-thick EVOH (32) was used as the polymer substrate. This polymer substrate was exposed to electron radiation with a dose of 90 kGy under vacuum at room temperature. The electron-irradiated polymer substrate was stored at −60° C. before the subsequent step.

A volume of 100 mL of an aqueous solution (manufactured by Tokyo Chemical Industry Co., Ltd.) containing 60% of DADMAC was placed in a 100 mL test tube, and was bubbled with nitrogen gas for 2 hours to remove oxygen from the system. The resulting solution was used as a monomer solution.

After that, the EVOH (32) prepared beforehand was cut into a 5-cm-square piece, which was immersed in the aqueous monomer solution. Graft polymerization was allowed to proceed for 6 hours during which the temperature of the solution was maintained at 70° C. After the graft polymerization, the resulting membrane was taken out of the solution and washed several times by repeated immersion in water for 1 hour or more. The washed membrane was placed in a drying oven set at 60° C. and dried for 2 hours. This resulted in a graft copolymer (EVOH (32)-g-DADMAC) composed of EVOH (32) having a DADMAC-derived graft chain introduced therein. The graft ratio of the resulting graft copolymer was 43%. Next, the grafted membrane was immersed in a 1 mol/L aqueous KOH solution for 2 hours to allow ion exchange to take place. After that, the resulting membrane was washed with pure water and then subjected to bubbling with carbon dioxide gas in pure water for 30 minutes, giving a graft copolymer having a carbonate ion-type quaternary ammonium salt group.

Example 1-2

A graft copolymer composed of EVOH (32) having a DADMAC-derived graft chain introduced therein was obtained in the same manner as in Example 1-1, except for changing the time of graft polymerization to 5 hours. The graft ratio of the obtained graft copolymer (EVOH (32)-g-DADMAC) was 36%. The subsequent steps including ion exchange were performed in the same manner as in Example 1-1 to obtain a graft copolymer having a carbonate ion-type quaternary ammonium salt group.

Example 1-3

A graft copolymer composed of EVOH (32) having a DADMAC-derived graft chain introduced therein was obtained in the same manner as in Example 1-1, except for changing the thickness of the EVOH (32) used as the polymer substrate to 30 μm, changing the temperature of graft polymerization to 50° C., and changing the time of graft polymerization to 15 hours. The graft ratio of the obtained graft copolymer (EVOH (32)-g-DADMAC) was 28%. The subsequent steps including ion exchange were performed in the same manner as in Example 1-1 to obtain a graft copolymer having a carbonate ion-type quaternary ammonium salt group.

Example 1-4

Graft polymerization was carried out in the same manner as in Example 1-1, except for changing the temperature of graft polymerization to 60° C. and changing the time of graft polymerization to 1 hour. The graft ratio of the resulting graft copolymer (EVOH (32)-g-DADMAC) was 24%. The subsequent steps including ion exchange were performed in the same manner as in Example 1-1 to obtain a graft copolymer having a carbonate ion-type quaternary ammonium salt group.

Example 1-5

Graft polymerization was carried out in the same manner as in Example 1-1, except for changing the thickness of the polymer substrate to 50 μm, changing the temperature of graft polymerization to 50° C., and changing the time of graft polymerization to 15 hours. The graft ratio of the resulting graft copolymer (EVOH (32)-g-DADMAC) was 12%. The subsequent steps including ion exchange were performed in the same manner as in Example 1-1 to obtain a graft copolymer having a carbonate ion-type quaternary ammonium salt group.

Example 1-6

Graft polymerization was carried out in the same manner as in Example 1-1, except for changing the dose of electron radiation applied to the polymer substrate to 30 kGy, changing the temperature of graft polymerization to 60° C., and changing the time of graft polymerization to 5 hours. The graft ratio of the resulting graft copolymer (EVOH (32)-g-DADMAC) was 16%. The subsequent steps including ion exchange were performed in the same manner as in Example 1-1 to obtain a graft copolymer having a carbonate ion-type quaternary ammonium salt group.

Example 1-7

Graft polymerization was carried out in the same manner as in Example 1-1, except for using an EVOH (44) as the polymer substrate and changing the time of graft polymerization to 5 hours. The graft ratio of the resulting graft copolymer (EVOH (44)-g-DADMAC) was 18%.

Example 1-8

A 30-μm-thick EVOH (44) was used as the polymer substrate, and this polymer substrate was heated in an oven at 140° C. for 1 hour. After that, the polymer substrate was cooled to room temperature and exposed to electron radiation with a dose of 90 kGy under vacuum at room temperature. Graft polymerization was then carried out in the same manner as in Example 1-7, except for changing the time of graft polymerization to 3 hours. The graft ratio of the resulting graft copolymer (EVOH (44)-g-DADMAC) was 26%. The subsequent steps including ion exchange were performed in the same manner as in Example 1-1 to obtain a graft copolymer having a carbonate ion-type quaternary ammonium salt group.

Example 1-9

Graft polymerization was carried out in the same manner as in Example 1-7, except for changing the dose of electron radiation applied to the polymer substrate to 30 kGy, changing the temperature of graft polymerization to 60° C., and changing the time of graft polymerization to 5 hours. The graft ratio of the resulting graft copolymer (EVOH (44)-g-DADMAC) was 9%. The subsequent steps including ion exchange were performed in the same manner as in Example 1-1 to obtain a graft copolymer having a carbonate ion-type quaternary ammonium salt group.

Example 1-10

Graft polymerization was carried out in the same manner as in Example 1-7, except for changing the thickness of the polymer substrate to 50 μm, changing the temperature of graft polymerization to 60° C., and changing the time of graft polymerization to 5 hours. The graft ratio of the resulting graft copolymer (EVOH (44)-g-DADMAC) was 5%. The subsequent steps including ion exchange were performed in the same manner as in Example 1-1 to obtain a graft copolymer having a carbonate ion-type quaternary ammonium salt group.

Example 1-11

Graft polymerization was carried out in the same manner as in Example 1-1, except for using a 30-μm-thick EVOH (29) as the polymer substrate, changing the temperature of polymerization to 60° C., and changing the time of graft polymerization to 5 hours. The graft ratio of the resulting graft copolymer (EVOH (29)-g-DADMAC) was 19%. The subsequent steps including ion exchange were performed in the same manner as in Example 1-1 to obtain a graft copolymer having a carbonate ion-type quaternary ammonium salt group.

Example 1-12

A 20-μm-thick EVOH (29) was used as the polymer substrate, and this polymer substrate was heated in an oven at 100° C. for 1 hour. After that, the polymer substrate was cooled to room-temperature and exposed to electron radiation with a dose of 90 kGy under vacuum at room temperature. Graft polymerization was then carried out in the same manner as in Example 1-1, except for changing the time of graft polymerization to 5 hours. The graft ratio of the resulting graft copolymer (EVOH (29)-g-DADMAC) was 48%. The subsequent steps including ion exchange were performed in the same manner as in Example 1-1 to obtain a graft copolymer having a carbonate ion-type quaternary ammonium salt group.

Comparative Example 1-1

An amount of 18 g of polystyrene-poly(ethylene/butylene) block-polystyrene copolymer resin (SEBS, styrene content=30 wt %) was dissolved in a mixture of 18 g of chloroform and 180 g of chloromethyl ethyl ether. To the resulting solution was added 1.5 g of zinc chloride ($ZnCl_2$), and the reaction solution thus prepared was heated to a temperature of 40° C. The temperature of the reaction solution was maintained at 40° C. for 1 hour, after which the reaction solution was introduced into 1000 mL of a mixture of methanol and water (methanol/water=1/1 in weight ratio) and the resulting solid was collected by filtration. The solid was washed twice with 200 mL of methanol and then dried under vacuum at 50° C., giving 18 g of chloromethylated SEBS. The obtained chloromethylated SEBS weighing 18 g was immersed in 200 mL of a 30 wt % acetone solution of triethylamine at 60° C. for 12 hours. After that, the resulting solid was collected by filtration and washed twice with acetone. The solid was then dried under vacuum to obtain 20 g of SEBS having a quaternary ammonium salt group.

Comparative Example 1-2

An amount of 10 g of polysulfone resin (PSU) was dissolved in 167.0 g of tetrachloroethane, and to the resulting solution was added 47.8 g of chloromethyl ethyl ether followed by 0.65 g of tin chloride ($SnCl_4$). The reaction solution thus prepared was then heated to a temperature of 50° C. The temperature of the reaction solution was maintained at 50° C. for 1 hour, after which the reaction solution was introduced into 1000 mL of methanol. The resulting solid was collected by filtration, washed twice with 200 mL of methanol, and then dried under vacuum at 50° C., giving 11 g of chloromethylated PSU. The obtained chloromethylated PSU weighing 5.0 g was dissolved in 20 g of N,N-dimethylformamide (DMF), and to the resulting solution was added 13.7 mL of a DMF solution containing 1 mol/L of dimethylbutylamine. The resulting solution was stirred at room temperature for 24 hours. After completion of the reaction, the reaction solution was poured into 200 mL of diethyl ether, and the resulting mixture was then filtered. The solid thus obtained was washed twice with 100 mL of diethyl ether and dried under vacuum. This resulted in 5.7 g of PSU having a quaternary ammonium salt group.

Comparative Example 1-3

An amount of 10 g of polyphenylsulfone resin (PPSU) was dissolved in 213.0 g of tetrachloroethane, and to the resulting solution was added 54.2 g of chloromethyl ethyl ether followed by 0.48 g of tin chloride ($SnCl_4$). The reaction solution thus prepared was then heated to a temperature of 80° C. The reaction solution was stirred with the temperature maintained at 80° C. The stirring was stopped after 1 hour and 15 minutes, and the reaction solution was cooled to a temperature of 50° C. The reaction solution was introduced into 1000 mL of methanol to give a solid. The solid was collected by filtration, washed twice with 200 mL of methanol, and dried under vacuum at 50° C., giving 10.5 g of chloromethylated PPSU. The obtained chloromethylated PPSU weighing 5.0 g was dissolved in 45 g of N,N-dimethylformamide (DMF), and to the resulting solution was added 17.7 mL of a DMF solution containing 1 mol/L of dimethylbutylamine. The resulting solution was stirred at room temperature for 24 hours. After completion of the reaction, the reaction solution was poured into 400 mL of diethyl ether, and the resulting solid was collected by filtration. The solid thus obtained was washed twice with 100 mL of diethyl ether and dried under vacuum, giving 6.1 g of PPSU having a quaternary ammonium salt group.

Table 1 lists the conditions of polymerization and the results of measurement of the ion-exchange capacity and ionic conductivity of the resins obtained above. The symbol "-" used in the column headed "Ionic conductivity" in Table 1 means that measurement was not conducted. Tables 2 and 3 list the results of the solubility test.

TABLE 1

| | Type of resin | Electron radiation dose (kGy) | Graft polymerization Temperature (° C.) | Graft polymerization Time (hours) | Graft ratio (%) | Ion-exchange capacity (Mmol/g) | Ionic conductivity (mS/cm) |
|---|---|---|---|---|---|---|---|
| Example 1-1 | EVOH (32) + DADMAC | 90 | 70 | 6 | 43 | 1.6 | 23.5 |
| Example 1-2 | EVOH (32) + DADMAC | 90 | 70 | 5 | 36 | 1.5 | — |
| Example 1-3 | EVOH (32) + DADMAC | 90 | 50 | 15 | 28 | 1.3 | — |
| Example 1-4 | EVOH (32) + DADMAC | 90 | 60 | 1 | 24 | 1.2 | — |
| Example 1-5 | EVOH (32) + DADMAC | 90 | 50 | 15 | 12 | 0.7 | — |
| Example 1-6 | EVOH (32) + DADMAC | 30 | 60 | 5 | 16 | 0.8 | — |
| Example 1-7 | EVOH (44) + DADMAC | 90 | 70 | 5 | 18 | 1.0 | 15.7 |
| Example 1-8 | EVOH (44) + DADMAC | 90 | 70 | 3 | 26 | 1.2 | 12.0 |
| Example 1-9 | EVOH (44) + DADMAC | 30 | 60 | 5 | 9 | 0.5 | — |
| Example 1-10 | EVOH (44) + DADMAC | 90 | 60 | 5 | 5 | 0.4 | — |
| Example 1-11 | EVOH (29) + DADMAC | 90 | 60 | 5 | 19 | 1.0 | — |
| Example 1-12 | EVOH (29) + DADMAC | 90 | 70 | 5 | 48 | 1.9 | 24.0 |
| Comparative Example 1-1 | SEBS | — | — | — | — | 1.2 | 16.6 |
| Comparative Example 1-2 | PSU | — | — | — | — | 1.2 | 6.2 |
| Comparative Example 1-3 | PPSU | — | — | — | — | 1.4 | 15.1 |

In Example 1-8 and Example 1-12, in which polymer substrates preheated at a temperature equal to or higher than the glass-transition point and equal to or lower than the melting point were used as described above, grafted membranes having a high graft ratio were obtained.

TABLE 2

| | Solubility (water/ethanol, equal proportions) |
|---|---|
| Example 1-1 | A |
| Example 1-2 | A |
| Example 1-3 | B |
| Example 1-4 | B |
| Example 1-5 | B |
| Example 1-6 | B |
| Example 1-7 | C |
| Example 1-8 | C |
| Example 1-9 | C |
| Example 1-10 | C |
| Example 1-11 | A |
| Example 1-12 | A |
| Comparative Example 1-1 | D |
| Comparative Example 1-2 | D |
| Comparative Example 1-3 | D |

TABLE 3

| | Solubility (water/1-propanol, wt %) | | | | | | | | |
|---|---|---|---|---|---|---|---|---|---|
| | 70/30 | 65/35 | 60/40 | 55/45 | 50/50 | 45/55 | 40/60 | 35/65 | 30/70 |
| Example 1-1 | B | A | A | A | A | A | A | A | B |
| Example 1-2 | B | A | A | A | A | A | A | A | B |
| Example 1-3 | B | A | A | A | A | A | A | A | B |
| Example 1-4 | B | A | A | A | A | A | A | A | B |
| Example 1-5 | B | B | A | A | A | A | A | A | A |
| Example 1-6 | B | B | A | A | A | A | A | A | B |
| Example 1-7 | B | B | B | B | A | A | A | A | A |
| Example 1-8 | B | B | B | A | A | A | A | A | A |
| Example 1-9 | B | B | B | B | B | A | A | A | A |
| Example 1-10 | B | B | B | B | B | A | A | A | A |
| Example 1-11 | B | A | A | A | A | A | A | A | C |
| Example 1-12 | A | A | A | A | A | A | A | A | C |
| Comparative Example 1-1 | D | D | D | D | D | D | D | D | D |
| Comparative Example 1-2 | D | D | D | D | D | D | D | D | D |
| Comparative Example 1-3 | D | D | D | D | D | D | D | D | D |

* For example, "70/30" refers to a mixed solvent of 70 wt % water and 30 wt % 1-propanol.

The resins produced in Comparative Examples 1-1 to 1-3 were anion-exchange resins which are commonly used in fuel cells.

The solubility of the resins prepared in Examples 1-1 to 1-12 was evaluated in the same manner as above, except for using water alone as the solvent. All of the resins were rated as "D", which means that they were all insoluble in water. Additionally, the solubility of the resins prepared in Examples 1-1 to 1-12 was evaluated in the same manner as above, except for using ethanol or 1-propanol alone as the solvent. All of the resins were rated as "D", which means that they were all insoluble in these alcohols.

Comparative Example 2-1

A 25-μm-thick UHMWPE film was used as the polymer substrate $S_2$ to be included in the second layer. This UHMWPE film was exposed to electron radiation in a nitrogen atmosphere at room temperature. The electron radiation was applied to one side of the film at an accelerating voltage of 250 kV and a dose of 90 kGy. The electron-irradiated UHMWPE film was cooled with dry ice to the temperature of the dry ice and then stored before the subsequent step.

Next, 550 g of 4-(chloromethyl)styrene as a monomer was bubbled with nitrogen gas to remove oxygen from the monomer liquid. The electron-irradiated UHMWPE film was immersed in the monomer liquid for 30 minutes during which the temperature of the monomer liquid was maintained at 70° C., and thus graft polymerization was allowed to proceed. Next, the grafted film was taken out of the reaction solution, washed by immersion in toluene for 1 hour or more, and further washed with acetone for 30 minutes. After the washing, the grafted film was dried in a dryer at 60° C. The graft ratio of the resulting grafted membrane was 100%. Next, the grafted membrane was immersed in an ethanol solution of triethylamine (manufactured by Sigma-Aldrich Co., LLC., concentration=30 wt %) at room temperature for 12 hours to quaternize the chloromethyl moiety. The grafted membrane subjected to the quaternization was washed with ethanol for 30 minutes, then with an ethanol solution containing 1N hydrochloric acid for 30 minutes, and then with pure water. After the washing, the grafted membrane was immersed in a 1 mol/L aqueous KOH solution for 2 hours to allow ion exchange to take place, and then the membrane was washed with pure water. Subsequently, the membrane was subjected to bubbling with carbon dioxide gas in pure water for 30 minutes, giving an anion-exchange membrane having a carbonate ion-type quaternary ammonium salt group.

Example 2-1

A 30-μm-thick EVOH (44) film (manufactured by KURARAY CO., LTD.) was used as the polymer substrate. This film was exposed to electron radiation in a nitrogen atmosphere at room temperature. The electron radiation was applied to one side of the film at an accelerating voltage of 250 kV and a dose of 90 kGy. The electron-irradiated EVOH (44) film was cooled with dry ice to the temperature of the dry ice and then stored before the subsequent step.

Next, 550 g of DADMAC as a monomer was bubbled with nitrogen gas to remove oxygen from the monomer liquid. The electron-irradiated EVOH (44) film was immersed in the monomer liquid for 3 hours during which the temperature of the monomer liquid was maintained at 70° C., and thus graft polymerization was allowed to proceed. Next, the grafted film was taken out of the reaction solution and washed several times by repeated immersion in pure water for 1 hour or more. After the washing, the film was dried in a dryer at 60° C. to obtain an EVOH (44)-DADMAC grafted membrane graft-polymerized with DADMAC. The graft ratio of the obtained grafted membrane was 30%. Next, the obtained grafted membrane was immersed in a 1 mol/L aqueous KOH solution for 2 hours to allow ion exchange to take place. After that, the membrane was washed with pure water and then subjected to bubbling with carbon dioxide gas in pure water for 30 minutes, giving a first layer-forming material (anion-exchange membrane) having a carbonate ion-type quaternary ammonium salt group.

The obtained first layer-forming material was placed in a mixed solvent of water and EtOH at 60° C., and the solvent was stirred for 2 hours to dissolve the material. Thus, a first layer-forming solution containing 2 wt % of the dissolved material was prepared. This solution was applied by spraying to the cathode-side principal surface of the anion-exchange membrane (second layer) obtained in Comparative Example 2-1. The spraying was followed by drying at 60° C. for 10 minutes to produce a multilayer body having a first layer with a thickness of 4 μm.

The results of measurement of the functional group retention of the anion-exchange membranes obtained in Example and Comparative Example are shown in Table 4.

TABLE 4

| Sample | Functional group retention [%] |
|---|---|
| Example 2-1 | 46 |
| Comparative Example 2-1 | 3 |

The multilayer body obtained in Example 2-1 exhibited a higher functional group retention than the membrane obtained in Comparative Example 2-1, which means that in the multilayer body of Example 2-1, deterioration of the anion-exchange group at the cathode-side principal surface of the membrane was successfully reduced.

Reference Example 3-1

An ultrahigh molecular weight polyethylene powder (HI-ZEX MILLION 240M, manufactured by Mitsui Chemicals, Inc.) was charged into a mold, and compressed and preformed by applying a pressure of 100 kg/cm$^2$ at 25° C. for 10 minutes. The pressure was then reduced to 30 kg/cm$^2$, while the temperature was increased to 210° C. This state was maintained for 120 minutes to melt the ultrahigh molecular weight polyethylene powder. Next, the pressure was increased up to 100 kg/cm$^2$, and the temperature was gradually decreased to room temperature over 120 minutes during which the pressure was maintained at 100 kg/cm$^2$. After that, the resulting ultrahigh molecular weight polyethylene product was removed from the mold. Thus, a cylindrical molded product was obtained as a sintered block having an outer diameter of 80 mm, an inner diameter of 40 mm, and a length of 80 mm. Next, the molded product was spirally cut to obtain a 25-μm-thick skived film. This skived film is referred to as "film 1".

One side of the film 1 was exposed to electron radiation in a nitrogen atmosphere at an accelerating voltage of 250 kV and a dose of 90 kGy. The electron-irradiated film 1 was cooled with dry ice to the temperature of the dry ice and then stored before the subsequent step.

Next, 550 g of 4-(chloromethyl)styrene as a monomer was bubbled with nitrogen gas to remove oxygen from the monomer liquid. The electron-irradiated film 1 was immersed in the monomer liquid at 70° C. for 30 minutes to allow graft polymerization to proceed. Next, the grafted film was taken out of the reaction solution, washed by immersion in toluene for 1 hour or more, and further washed with acetone for 30 minutes. After that, the film was placed in a dryer set at 80° C. and thus dried to obtain a grafted membrane. The graft ratio of the obtained grafted membrane was 100%.

Next, the obtained grafted membrane was immersed in an ethanol solution of triethylamine (containing 30 wt % of triethylamine) at room temperature for 12 hours to quaternize the chloromethyl moiety. The grafted membrane subjected to the quaternization was washed with ethanol for 30 minutes, then with an ethanol solution containing 1 mol/L HCl for 30 minutes, and then with pure water. After that, the membrane was immersed in a 1 mol/L aqueous KOH solution for 2 hours to allow ion exchange to take place, and then the membrane was washed with pure water. Subsequently, the membrane was subjected to bubbling with carbon dioxide gas in pure water for 30 minutes, giving an anion-exchange membrane (second layer) having a carbonate ion-type quaternary ammonium salt group.

Example 3-1

A 30-μm-thick EVOH (44) film (manufactured by KURARAY CO., LTD.) was used as the polymer substrate $S_1$. This EVOH (44) film was exposed to electron radiation in a nitrogen atmosphere at room temperature. The electron radiation was applied to one side of the polymer substrate $S_1$ at an accelerating voltage of 250 kV and a dose of 90 kGy. The electron-irradiated EVOH (44) film was cooled with dry ice to the temperature of the dry ice and then stored before the subsequent step.

Next, 550 g of DADMAC as a monomer was bubbled with nitrogen gas to remove oxygen from the monomer liquid. The electron-irradiated EVOH (44) film was immersed in the monomer liquid at 70° C. for 3 hours to allow graft polymerization to proceed. Next, the film having undergone graft polymerization was taken out of the reaction solution and washed several times by repeated immersion in pure water for 1 hour or more. After the washing, the film was dried in a dryer at 60° C. to obtain an EVOH (44)-DADMAC grafted membrane graft-polymerized with DADMAC. The graft ratio of the obtained grafted membrane was 30%. Next, the dried grafted membrane was immersed in a 1 mol/L aqueous KOH solution for 2 hours to allow ion exchange to take place, and then the membrane was washed with pure water. After that, the membrane was subjected to bubbling with carbon dioxide gas in pure water for 30 minutes, giving a grafted membrane having a carbonate ion-type quaternary ammonium salt group. The grafted membrane was dissolved in a mixed solvent of water and ethanol (water/ethanol=30/70 wt %/wt %) to a concentration of 2 wt %. The resulting solution was used as a first layer-forming solution.

A commercially-available electrode containing platinum-carrying carbon was cut into a piece with a size of 20 mm×20 mm. The piece of the electrode was immersed in an ethylenediamine-ethanol mixture (ethylenediamine/ethanol=3/7 (wt %/wt %)) at room temperature for 12 hours or more, after which the piece of the electrode was air-dried (electrode-0). A principal surface of this electrode was sprayed with the first layer-forming solution, and the spraying was followed by drying at 60° C. for 10 minutes to produce a gas diffusion electrode (electrode-1) having a first layer consisting of an EVOH(44)-DADMA grafted membrane. The thickness of the first layer was 4 μm. This electrode-1, the second layer (40 mm×40 mm) formed in Reference Example 3-1, and the electrode-0 were stacked in this order to form a MEA. In the MEA, a second principal surface of the first layer was in contact with a first principal surface of the second layer. This MEA was used as a test specimen for simulated durability test; specifically, the MEA was set in the testing cell for simulated durability test so that the electrode-1 served as the cathode, and in this state a simulated durability test was conducted. After the simulated durability test, the intensity of the peak attributed to the functional group was measured for the first principal surface of the second layer.

Comparative Example 3-1

A pair of electrodes-0 were prepared in the same manner as in Example 3-1. The second layer as obtained in Reference Example 3-1 was sandwiched between the pair of electrodes-0 to form a MEA, which was set in the testing cell for simulated durability test to conduct a simulated durability test. After the simulated durability test, the intensity of the peak attributed to the functional group was measured for the cathode-side principal surface of the second layer.

The results of measurement of the functional group retention of the membranes obtained in Example and Comparative Example are shown in Table 5.

TABLE 5

| Sample | Functional group retention [%] |
|---|---|
| Example 3-1 | 48 |
| Comparative Example 3-1 | 2 |

Example 3-1 yielded a higher functional group retention than Comparative Example 3-1, which means that in Example 3-1, deterioration of the anion-exchange group of the anion-exchange membrane was successfully reduced.

REFERENCE SIGNS LIST

1 Membrane-electrode assembly (MEA)
2 Anion-exchange polymer electrolyte membrane
3 Anode
4 Cathode
5 Anode separator
6 Cathode separator
7 First layer
8 Multilayer body
10 Polymer electrolyte fuel cell (PEFC)
11, 21 Gasket
11a, 21a Opening
12, 22 Separator
12a, 22a Flow path
13, 23 Current collecting plate
14, 24 End plate
18, 19, 28, 29 Flow path
20 Membrane for simulated durability test
100 Testing cell

The invention claimed is:

1. A resin comprising a copolymer having a first structural unit represented by the following formula (1) and/or a second structural unit represented by the following formula (2), the copolymer further having a structural unit having a polar group:

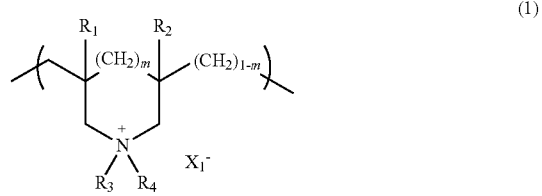

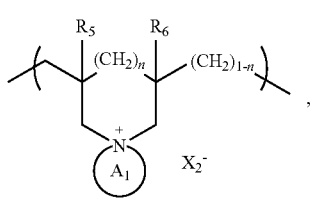

(2)

wherein
$R_1$, $R_2$, $R_5$, and $R_6$ are each independently a hydrogen atom or an alkyl group having 1 to 8 carbon atoms,
$R_3$ and $R_4$ are each independently a hydrogen atom or an alkyl group having 1 to 18 carbon atoms,
$X_1$ and $X_2$ are each independently a halide ion, a hydroxide ion, or an anion of an organic or inorganic acid,
$A_1$ is a structure bonded to a nitrogen atom to form a ring, the structure being a saturated carbon chain having 3 to 7 carbon atoms or a structure resulting from substitution of a heteroatom for a part of the carbon atoms of the saturated carbon chain,
m and n are each independently 0 or 1,
the copolymer is a graft copolymer comprising a polymer substrate and a graft chain introduced into the polymer substrate,
the polymer substrate has the structural unit having the polar group,
the graft chain has either the first structural unit or the second structural unit or both, and
the polymer substrate is an ethylene-vinyl alcohol copolymer.

2. The resin according to claim 1, wherein the structural unit having a polar group is a third structural unit represented by the following formula (3):

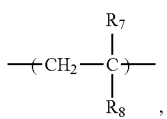

(3)

wherein
$R_7$ is a hydrogen atom or a methyl group, and
$R_8$ is a hydrophilic polar group, or an alkyl group which has 1 to 8 carbon atoms and in which at least one hydrogen atom is substituted by a hydrophilic polar group.

3. The resin according to claim 1, wherein the copolymer further has a fourth structural unit represented by the following formula (4):

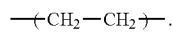 (4)

4. The resin according to claim 2, wherein $R_8$ is a hydrophilic polar group, or an alkyl group which has 1 to 3 carbon atoms and in which at least one hydrogen atom is substituted by a hydrophilic polar group.

5. The resin according to claim 2, wherein
the copolymer is a graft copolymer, and
the graft copolymer comprises: a polymer substrate having the third structural unit; and a graft chain having the first structural unit and/or the second structural unit.

6. The resin according to claim 2, wherein the hydrophilic polar group is at least one selected from the group consisting of a carboxyl group, a sulfo group, a phosphonate group, a hydroxyl group, an ester group, an ether group, an amide group, and an amino group.

7. A resin-containing liquid comprising the resin according to claim 1 and a solvent.

8. The resin-containing liquid according to claim 7, wherein
the solvent is a mixed solvent containing a water-soluble organic solvent and water, and
a maximum amount of the water-soluble organic solvent soluble in 1 L of water at 20° C. is 20 g or more.

9. The resin-containing liquid according to claim 7, wherein the resin is dissolved in the solvent.

10. A multilayer body comprising two or more layers, wherein the layers include a first layer containing the resin according to claim 1.

11. The multilayer body according to claim 10, wherein
the two or more layers include a second layer,
the second layer has an anion-exchange polymer electrolyte membrane, and
the first layer is stacked on the second layer.

12. The multilayer body according to claim 11, wherein
the anion-exchange polymer electrolyte membrane has a polymer substrate and a graft chain, and
the graft chain has a functional group having anionic conductivity.

13. The multilayer body according to claim 10, wherein
the two or more layers include a catalyst layer, and
the first layer is stacked on the catalyst layer.

14. A member for an electrochemical element, the member comprising the multilayer body according to claim 13 and a base material, wherein
the base material, the catalyst layer, and the first layer are stacked in this order.

15. An electrochemical element comprising an anion-exchange polymer electrolyte membrane and an electrode, wherein
a principal surface of the anion-exchange polymer electrolyte membrane is in contact with a principal surface of the electrode, and
the electrode contains the resin according to claim 1.

16. An electrochemical element comprising an anode, a cathode, and a multilayer body comprising an anion-exchange polymer electrolyte membrane, wherein
the multilayer body is the multilayer body according to claim 11, and
the multilayer body is sandwiched between the anode and the cathode.

17. An electrochemical device comprising the electrochemical element according to claim 15.

18. An electrochemical device comprising the electrochemical element according to claim 16.

19. The resin according to claim 1, wherein an ethylene content of the ethylene-vinyl alcohol copolymer is 20 to 50 mol %.

20. The resin according to claim 1, wherein the resin is devoid of a crosslinked structure.

21. The resin according to claim 1, wherein the resin is insoluble in water.

22. The resin according to claim 1, wherein the resin is insoluble in alcohol.

23. The resin according to claim 1, wherein the resin has a property of being fully dissolved in a predetermined mixed solvent after steps 1) to 3) of a solubility test using the mixed solvent, wherein the steps 1) to 3) of the solubility test comprise:
  step 1) preparing a resin-containing liquid containing 2 wt % of a resin using the predetermined mixed solvent selected from a mixed solvent of 55 wt % 1-propanol and 45 wt % water, a mixed solvent of 60 wt % 1-propanol and 40 wt % water, and a mixed solvent of 65 wt % 1-propanol and 35 wt % water;
  step 2) heating and maintaining the resin-containing liquid prepared in the step 1) at 60° C. for 24 hours under stirring; and
  step 3) naturally cooling the resin-containing liquid prepared in the step 2) to 23° C. and leaving for 24 hours.

* * * * *